(12) United States Patent
Chung et al.

(10) Patent No.: US 12,021,589 B2
(45) Date of Patent: Jun. 25, 2024

(54) METHOD FOR REPORTING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Jaehoon Chung, Seoul (KR); Haewook Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 17/422,268

(22) PCT Filed: Jan. 10, 2020

(86) PCT No.: PCT/KR2020/000455
§ 371 (c)(1),
(2) Date: Jul. 12, 2021

(87) PCT Pub. No.: WO2020/145716
PCT Pub. Date: Jul. 16, 2020

(65) Prior Publication Data
US 2022/0123805 A1 Apr. 21, 2022

(30) Foreign Application Priority Data

Jan. 11, 2019 (KR) .......................... 10-2019-0003811
Jan. 11, 2019 (KR) .......................... 10-2019-0003829

(Continued)

(51) Int. Cl.
*H04B 7/06* (2006.01)
*H04B 7/0456* (2017.01)
*H04W 72/21* (2023.01)

(52) U.S. Cl.
CPC ......... *H04B 7/0626* (2013.01); *H04B 7/0456* (2013.01); *H04W 72/21* (2023.01)

(58) Field of Classification Search
CPC .... H04B 7/0626; H04B 7/0456; H04W 72/21
(Continued)

(56) References Cited

U.S. PATENT DOCUMENTS

| 10,917,523 | B2 * | 2/2021 | Nam | H04L 5/0048 |
| 2010/0183086 | A1 * | 7/2010 | Ko | H04L 5/0053 375/260 |
| 2016/0072562 | A1 * | 3/2016 | Onggosanusi | H04B 7/0479 370/329 |
| 2016/0157218 | A1 * | 6/2016 | Nam | H04B 7/0632 370/329 |

(Continued)

FOREIGN PATENT DOCUMENTS

| EP | 3748866 B1 * | 12/2022 | H04B 7/0469 |
| KR | 10-2013-0075311 | 7/2013 | |

(Continued)

OTHER PUBLICATIONS

PCT International Search Report in International Appln. No. PCT/KR2020/000455, dated Apr. 29, 2020, 5 pages.

*Primary Examiner* — Mong-Thuy T Tran
(74) *Attorney, Agent, or Firm* — Fish & Richardson P.C.

(57) ABSTRACT

The disclosure discloses a method for reporting channel state information (CSI) in a wireless communication system, and an apparatus therefor. Particularly, a method by which a user equipment (UE) reports channel state information (CSI) in a wireless communication system comprises the steps of: receiving, from a base station (BS), CSI-related configuration information; receiving, from the base station, a reference signal; calculating CSI on the basis of the reference signal; and transmitting the CSI to the base station, wherein the CSI includes information related to a codebook, the information related to the codebook includes a bitmap related to an amplitude coefficient and a phase coefficient, and the size of the bitmap may be set by multiplying the (Continued)

number of bases of a spatial domain for the CSI by the number of bases of a frequency domain for the CSI.

18 Claims, 11 Drawing Sheets

(30) Foreign Application Priority Data

| | | | |
|---|---|---|---|
| Jan. 11, 2019 | (KR) | ......................... | 10-2019-0003848 |
| Feb. 26, 2019 | (KR) | ......................... | 10-2019-0022678 |
| Feb. 26, 2019 | (KR) | ......................... | 10-2019-0022692 |
| Feb. 26, 2019 | (KR) | ......................... | 10-2019-0022701 |

(58) Field of Classification Search
   USPC .......................................................... 370/329
   See application file for complete search history.

(56) References Cited

U.S. PATENT DOCUMENTS

| | | | | |
|---|---|---|---|---|
| 2016/0182137 | A1* | 6/2016 | Onggosanusi | H04B 7/0479 |
| | | | | 370/329 |
| 2018/0175993 | A1* | 6/2018 | Onggosanusi | H04B 7/0486 |
| 2018/0227029 | A1 | 8/2018 | Nammi et al. | |
| 2020/0153541 | A1* | 5/2020 | Faxér | H04L 5/0057 |
| 2020/0403660 | A1* | 12/2020 | Zhang | H04L 5/0023 |
| 2021/0044409 | A1* | 2/2021 | Davydov | H04L 1/1671 |

FOREIGN PATENT DOCUMENTS

| | | |
|---|---|---|
| KR | 10-2017-0020287 | 2/2017 |
| KR | 10-2018-0127447 | 11/2018 |
| KR | 10-2018-0136406 | 12/2018 |

* cited by examiner

[Fig. 1]
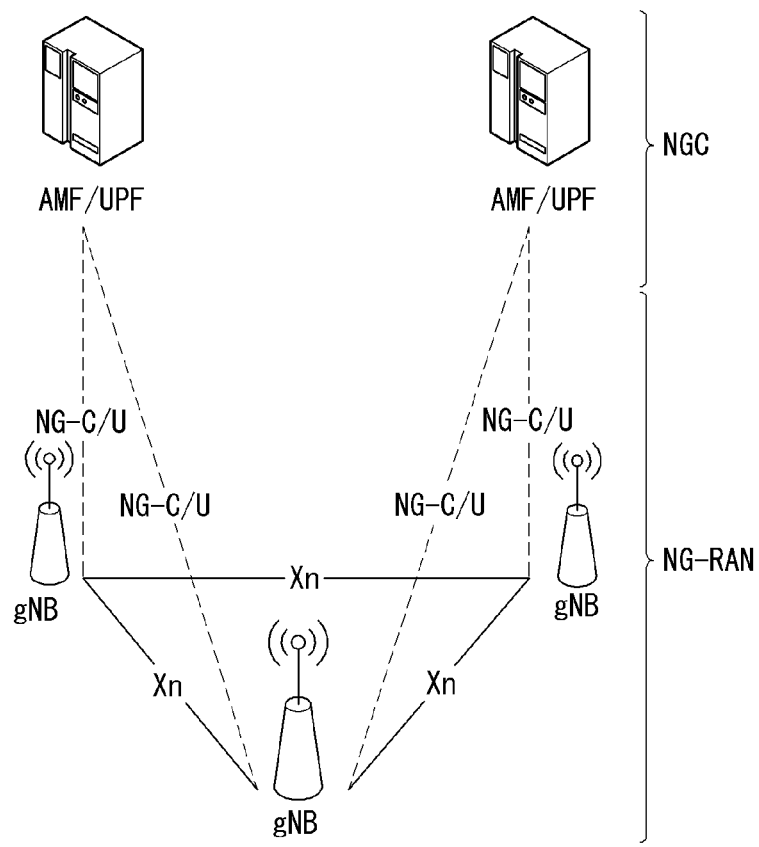
[Fig. 2]
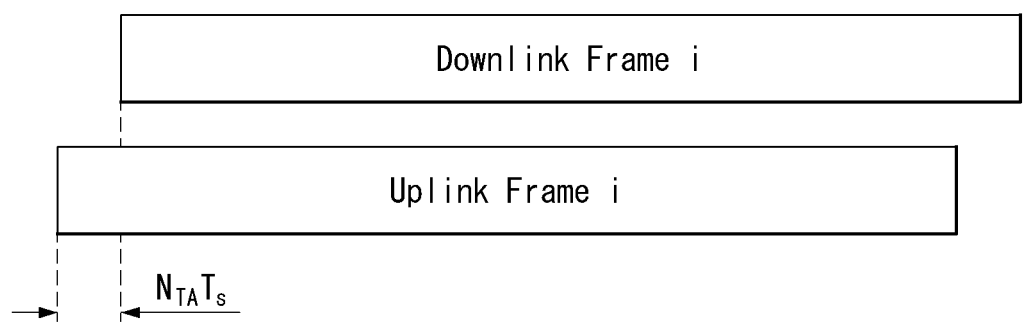

[Fig. 3]
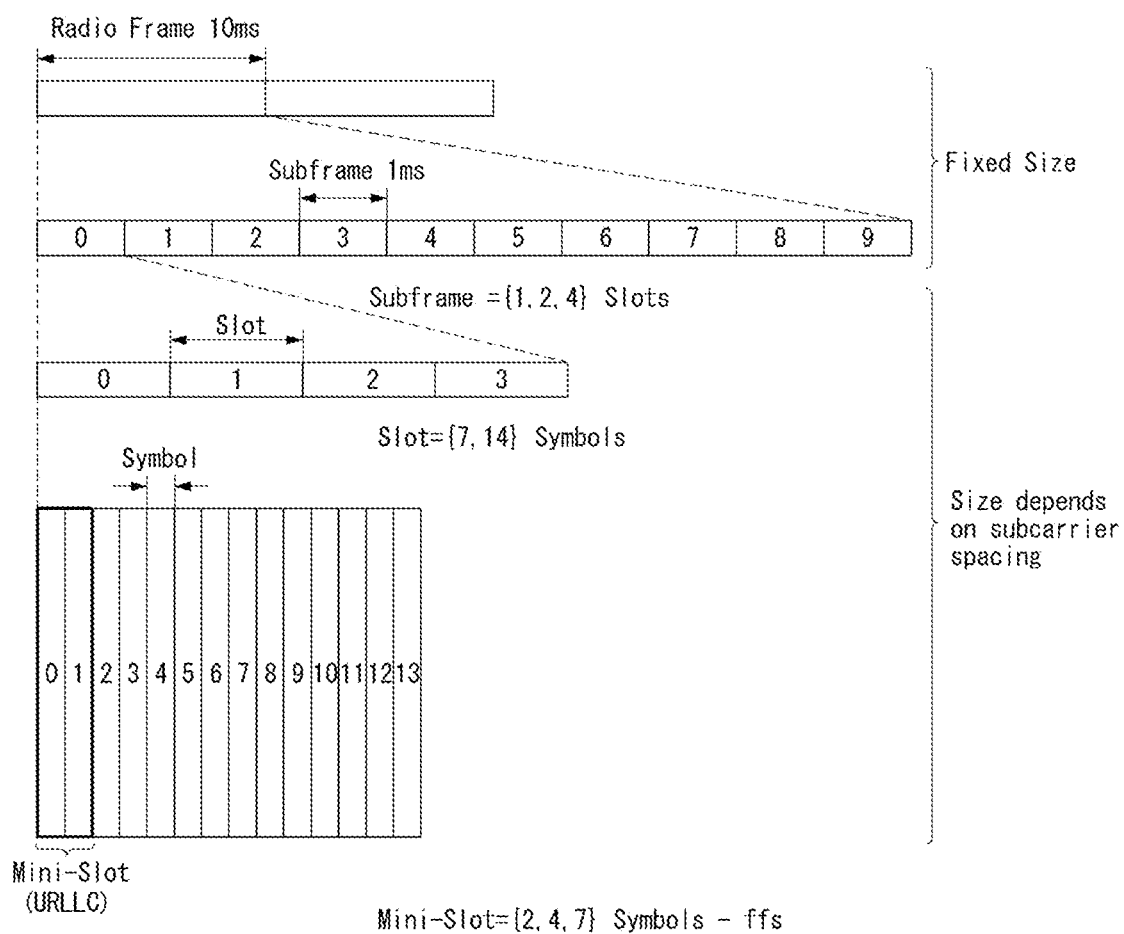

[Fig. 4]
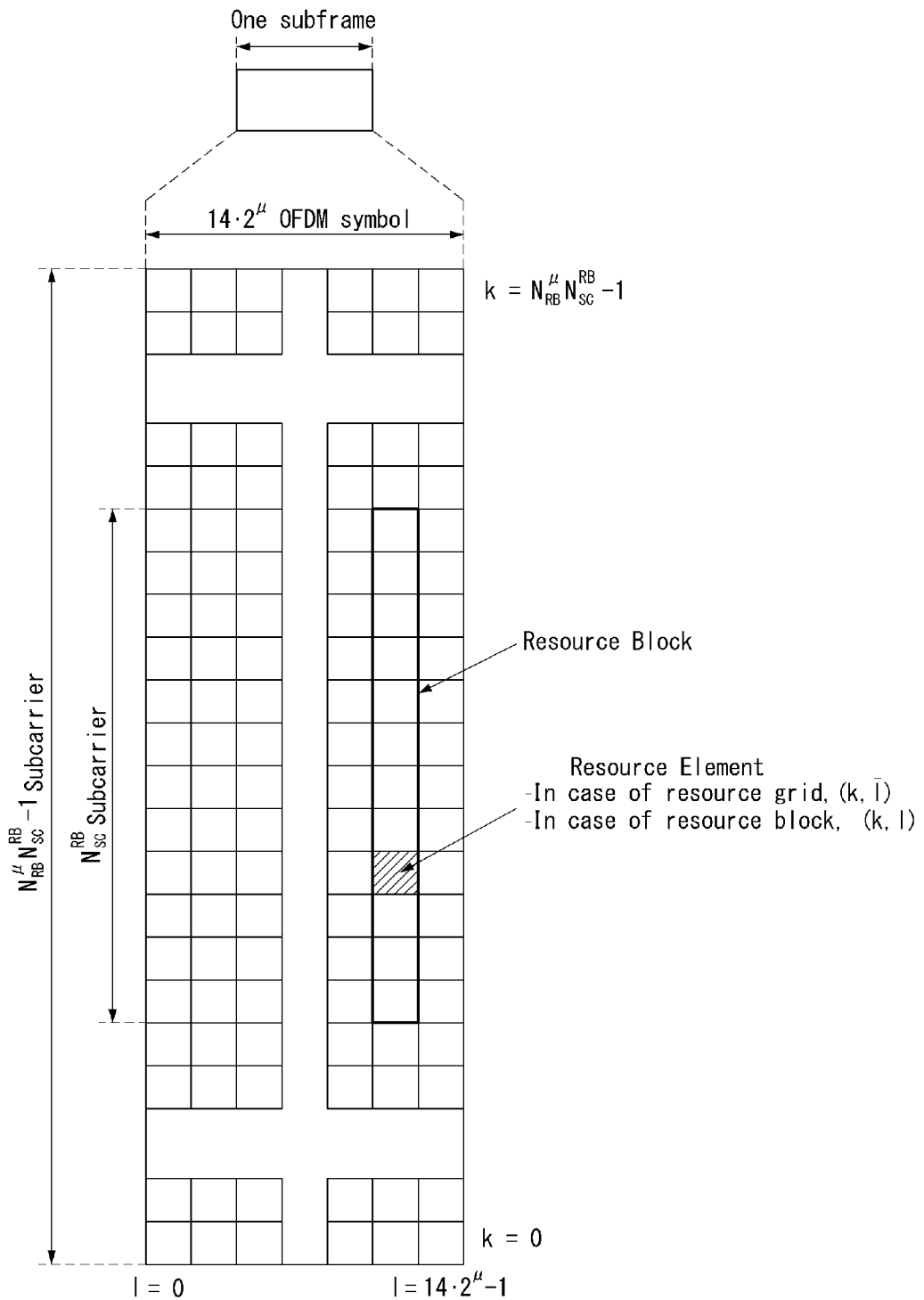

[Fig. 5]
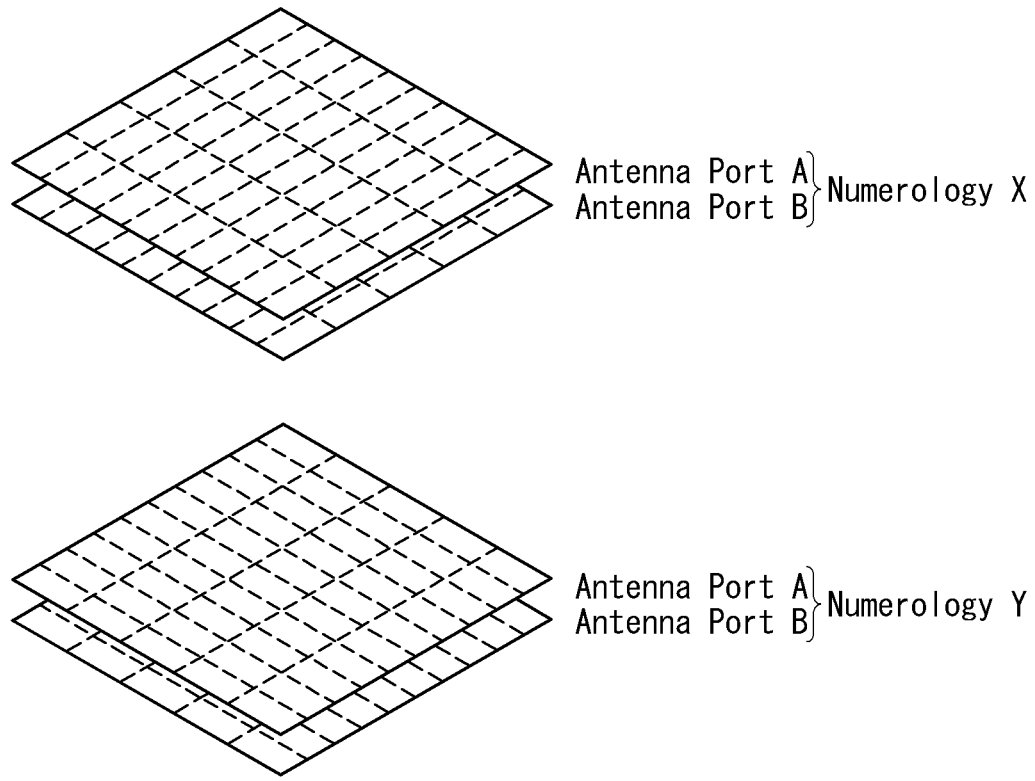
[Fig. 6]
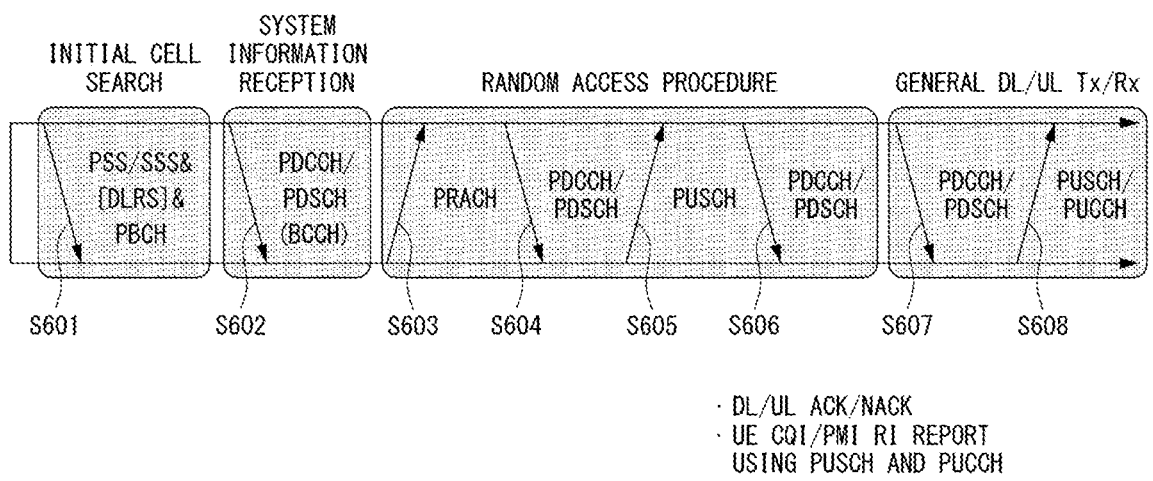

[Fig. 7]
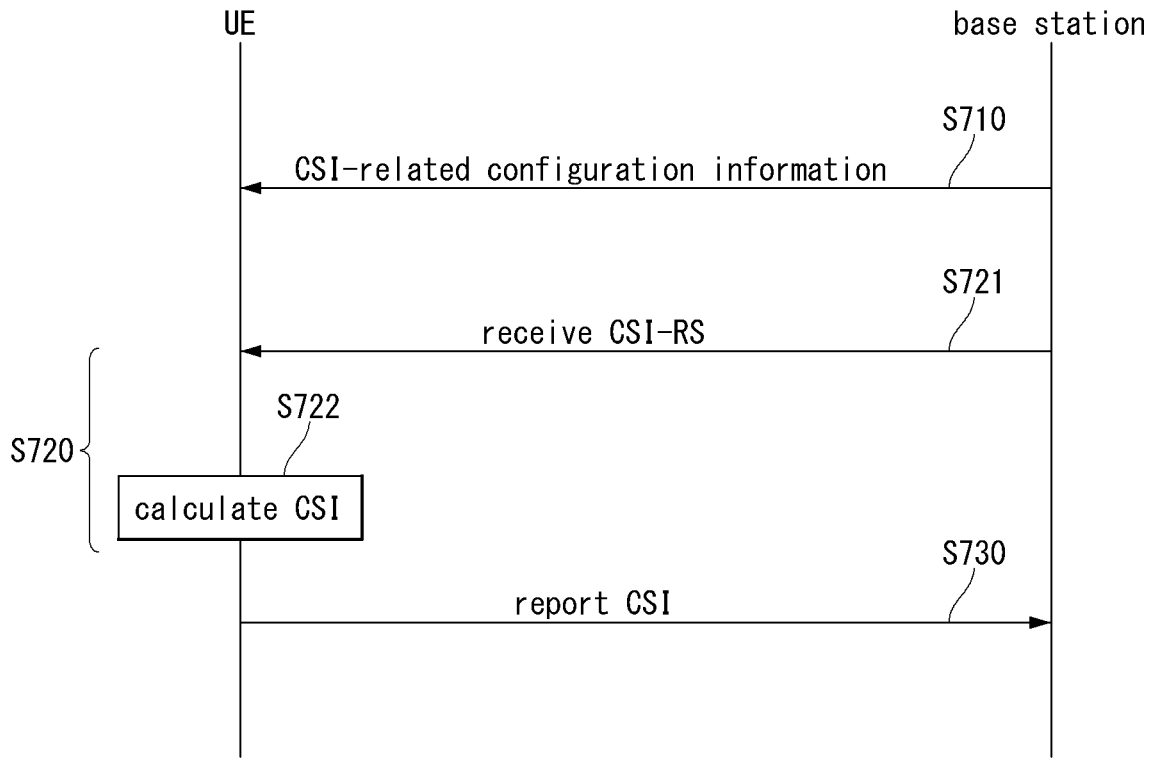
[Fig. 8]
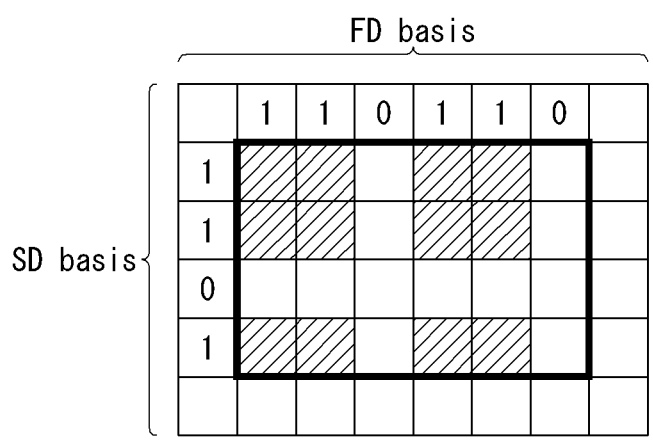

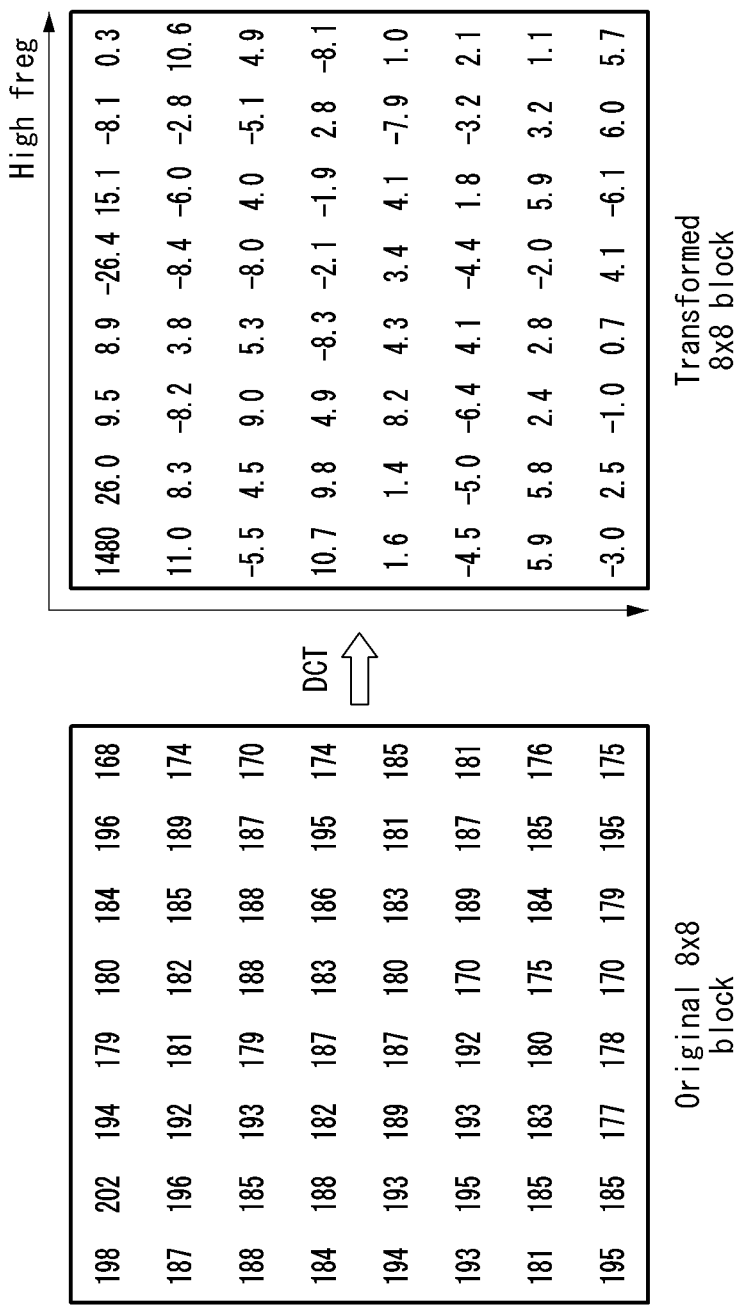
[Fig. 9]

【Fig. 10】
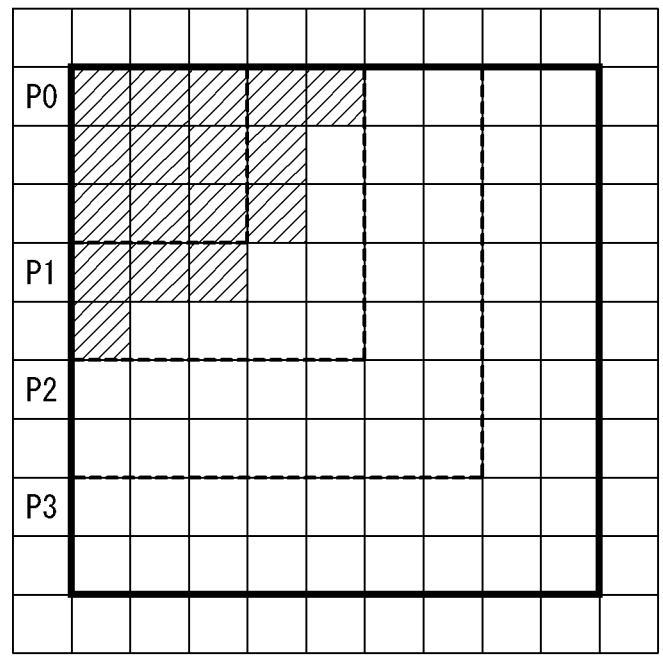
【Fig. 11】
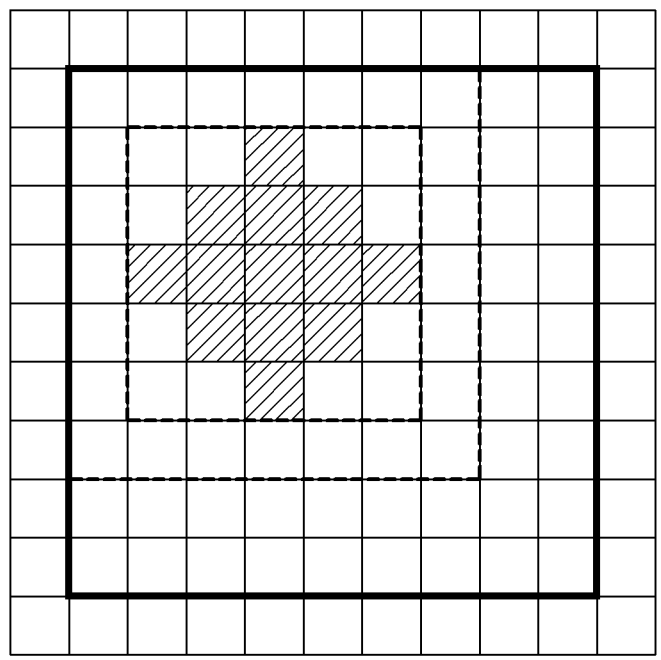

[Fig. 12]
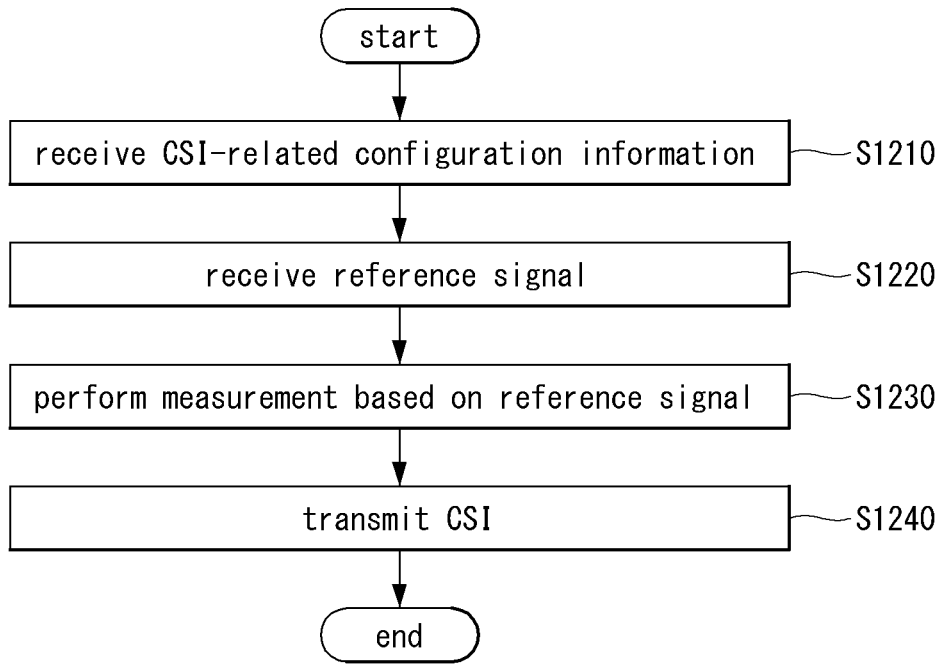
[Fig. 13]
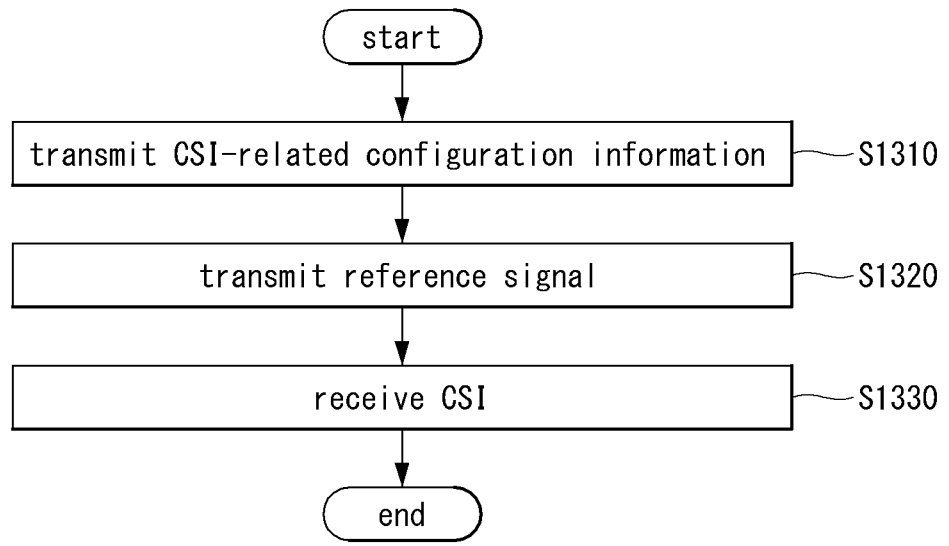

[Fig. 14]
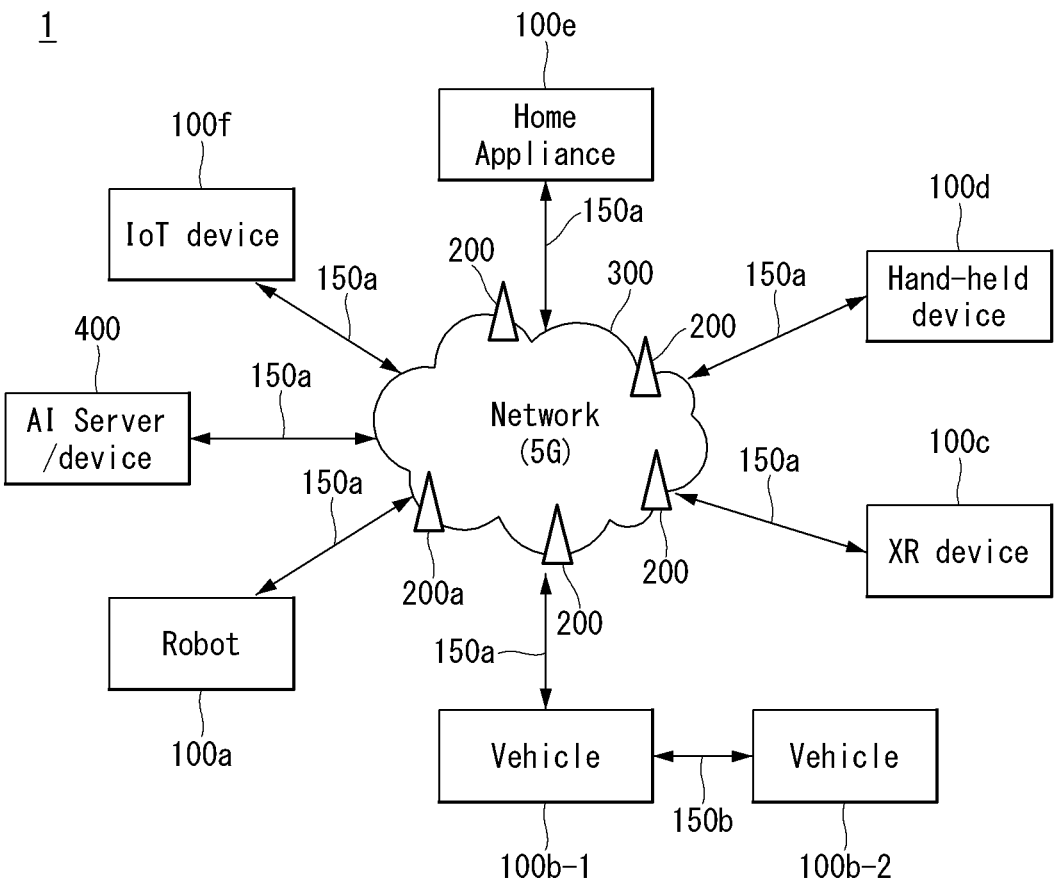
[Fig. 15]
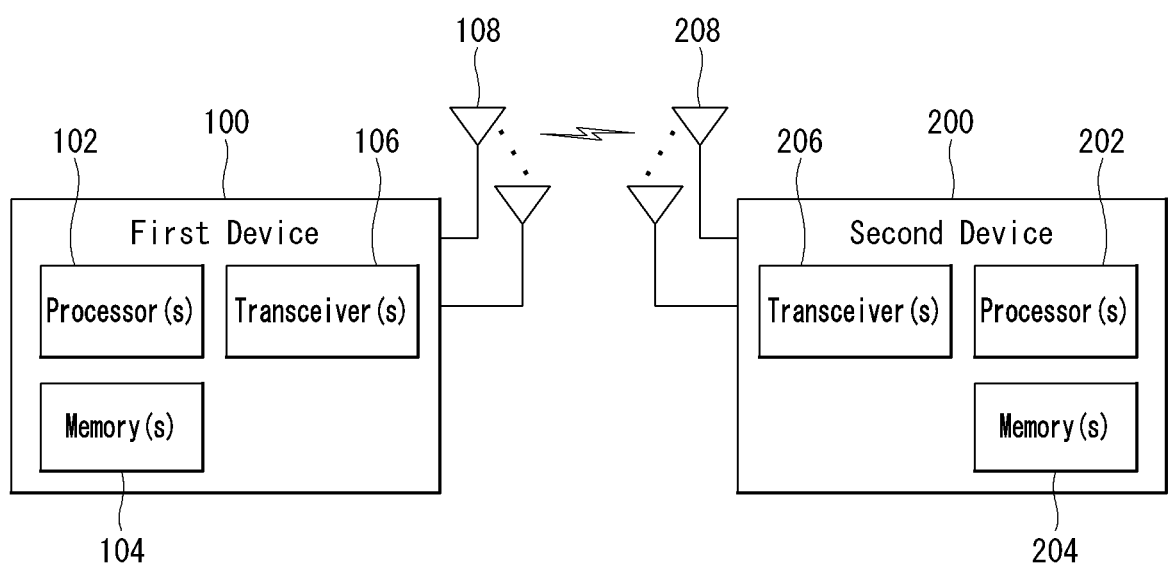

[Fig. 16]
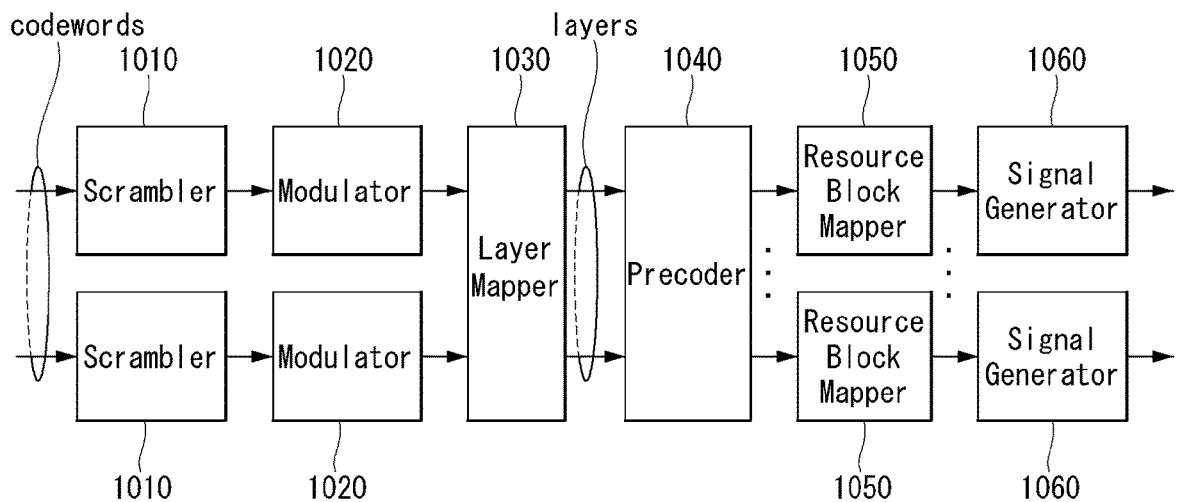
[Fig. 17]
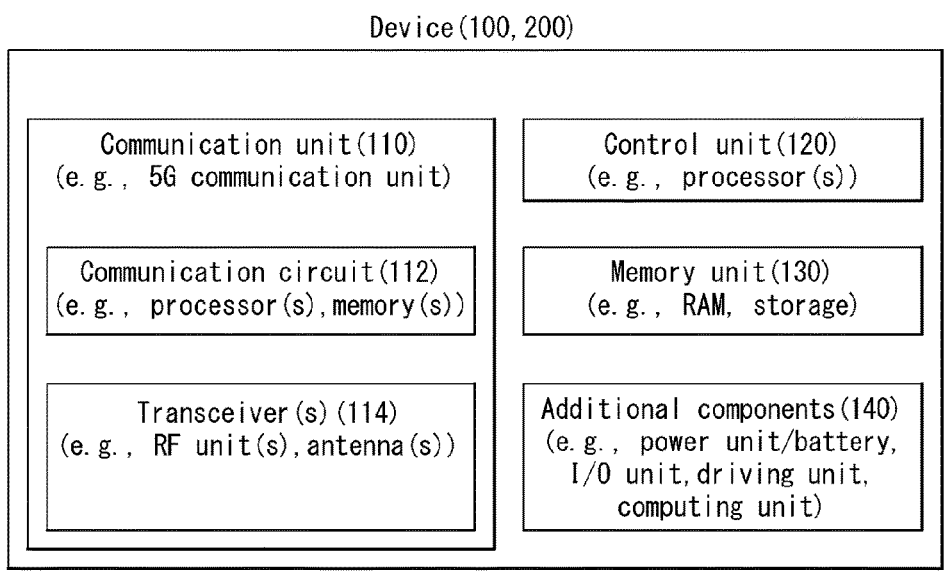

[Fig. 18]
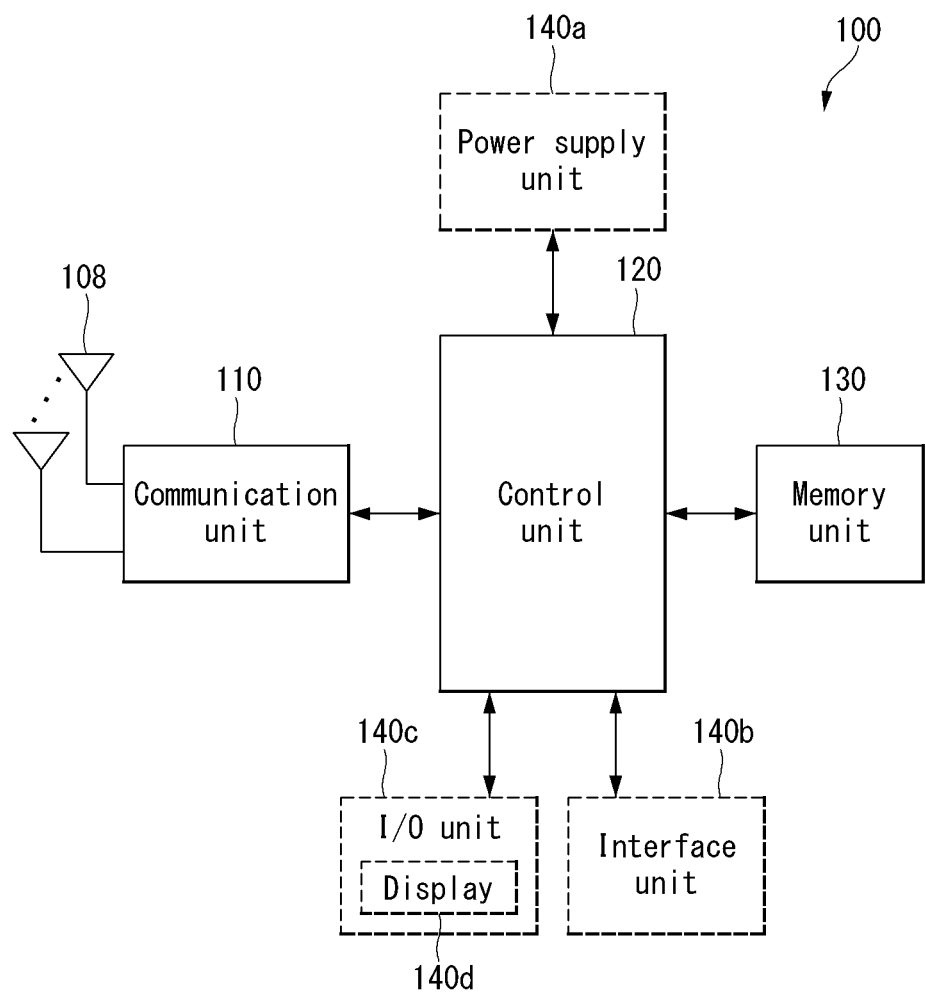

METHOD FOR REPORTING CHANNEL STATE INFORMATION IN WIRELESS COMMUNICATION SYSTEM, AND APPARATUS THEREFOR

CROSS-REFERENCE TO RELATED APPLICATIONS

This application is a National Stage application under 35 U.S.C § 371 of International Application No. PCT/KR2020/000455, filed on Jan. 10, 2020, which claims the benefit of Korean Patent Application No. 10-2019-0022701, filed on Feb. 26, 2019, Korean Patent Application No. 10-2019-0022692, filed Feb. 26, 2019, Korean Patent Application No. 10-2019-0022678, filed on Feb. 26, 2019, Korean Patent Application No. 10-2019-0003848, filed on Jan. 11, 2019, Korean Patent Application No. 10-2019-0003829, filed on Jan. 11, 2019, and Korean Patent Application No. 10-2019-0003811, filed on Jan. 11, 2019. The disclosures of the prior application are incorporated by reference in their entirety.

TECHNICAL FIELD

The disclosure relates to a wireless communication system, and more specifically, to a method for reporting channel state information based on a codebook design elaborate and efficient in light of overhead and a device for supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The disclosure proposes a method for reporting channel state information (CSI) in a wireless communication system.

Specifically, the disclosure proposes a method for designing a codebook that is elaborate and efficient in terms of overhead, and reporting channel state information based thereupon.

Further, the disclosure proposes a method for transmitting bitmap information for a matrix including an amplitude coefficient and a phase coefficient in an enhanced Type II CSI report.

Further, the disclosure proposes a method for performing quantization on an amplitude coefficient and a phase coefficient considering characteristics of each rank indicator (RI)/layer, and transmitting quantization-related information.

Further, the disclosure proposes a method for differentially quantizing an amplitude coefficient and a phase coefficient within a layer considering the characteristics of the channel transformation method.

Technical objects to be achieved in the disclosure are not limited to the aforementioned technical objects, and other technical objects not described above may be evidently understood by a person having ordinary skill in the art to which the disclosure pertains from the following description.

Technical Solution

According to an embodiment of the disclosure, a method for reporting channel state information (CSI) by a user equipment (UE) in a wireless communication system comprises receiving CSI-related configuration information from a base station (BS), receiving a reference signal from the BS, calculating CSI based on the reference signal, and transmitting the CSI to the BS, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

Further, in the method according to an embodiment of the disclosure, the CSI may be transmitted through uplink control information (UCI) including a first part and a second part, and the bitmap may be included in the second part.

Further, in the method according to an embodiment of the disclosure, a size of the second part may be set based on at least one information included in the first part.

Further, in the method according to an embodiment of the disclosure, the bitmap may be configured per layer.

Further, in the method according to an embodiment of the disclosure, the amplitude coefficient and the phase coefficient may be included in a first matrix, and the first matrix may correspond to a linear combination of a second matrix including the bases of the spatial domain and a third matrix including the bases of the frequency domain.

Further, in the method according to an embodiment of the disclosure, the information related to the codebook may further include information related to the amplitude coefficient and information related to the phase coefficient, and the bitmap may indicate whether the information related to the amplitude coefficient and the information related to the phase coefficient are reported.

Further, the method according to an embodiment of the disclosure may further comprise quantizing the amplitude coefficient and the phase coefficient. The CSI may include information related to quantization.

Further, in the method according to an embodiment of the disclosure, the quantization may be performed per layer.

Further, in the method according to an embodiment of the disclosure, an index of the layer may be inversely proportional to a quantization level.

Further, in the method according to an embodiment of the disclosure, the information related to the quantization may include the index of the layer, information for a bit number of the amplitude coefficient, and information for a bit number of the phase coefficient.

Further, in the method according to an embodiment of the disclosure, the information related to the quantization may include bitmap information for the quantization per layer.

Further, in the method according to an embodiment of the disclosure, the information related to the quantization may include at least one of i) channel transform information for each layer, ii) valid value or valid area information for a transformed channel per layer, or iii) quantization bit information per valid area.

Further, in the method according to an embodiment of the disclosure, a value other than the valid value may be set to 0 as an amplitude of each coefficient is smaller than a specific threshold.

Further, in the method according to an embodiment of the disclosure, the valid area information may be represented with index and range of one of the valid value.

According to an embodiment of the disclosure, a user equipment (UE) reporting channel state information (CSI) in a wireless communication system comprises one or more transceivers, one or more processors, and one or more memories storing instructions for operations executed by the one or more processors and connected with the one or more processors, wherein the operations include receiving CSI-related configuration information from a base station (BS), receiving a reference signal from the BS, calculating CSI based on the reference signal, and transmitting the CSI to the BS, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

According to an embodiment of the disclosure, there is provided a device including one or more memories and one or more processors functionally connected with the one or more memories, wherein the one or more processors control the device to receive CSI-related configuration information from a base station (BS), receive a reference signal from the BS, calculate CSI based on the reference signal, and transmit the CSI to the BS, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

According to an embodiment of the disclosure, there may be provided one or more non-transitory computer-readable media storing one or more instructions executable by one or more processors, the one or more instructions instructing a user equipment to receive CSI-related configuration information from a base station (BS), receive a reference signal from the BS, calculate CSI based on the reference signal, and transmit the CSI to the BS, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

According to an embodiment of the disclosure, a method for receiving channel state information (CSI) by a base station (BS) in a wireless communication system comprises transmitting CSI-related configuration information to a user equipment (UE), transmitting a reference signal to the UE, and receiving CSI from the UE, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

According to an embodiment of the disclosure, a base station (BS) receiving channel state information (CSI) in a wireless communication system comprises one or more transceivers, one or more processors, and one or more memories storing instructions for operations executed by the one or more processors and connected with the one or more processors, wherein the operations include transmitting CSI-related configuration information to a user equipment (UE), transmitting a reference signal to the UE, and receiving CSI from the UE, wherein the CSI includes information related to a codebook, wherein the information related to the codebook includes a bitmap related to an amplitude coefficient and a phase coefficient, and wherein a size of the bitmap is set as a product of a number of bases of a spatial domain for the CSI and a number of bases of a frequency domain for the CSI.

Advantageous Effects

According to an embodiment of the disclosure, it is possible to design a sophisticated and efficient codebook in terms of overhead, and to report channel state information based on thereon.

In addition, according to an embodiment of the disclosure, bitmap information for a matrix including an amplitude coefficient and a phase coefficient in an enhanced Type II CSI report. can be transmitted.

In addition, according to an embodiment of the disclosure, quantization on an amplitude coefficient and a phase coefficient considering characteristics of each rank indicator (RI)/layer may be performed and quantization-related information may be transmitted.

Also, according to an embodiment of the disclosure, an amplitude coefficient and a phase coefficient may be quantized by differentially within a layer, considering the characteristics of the channel transformation method.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 is a flowchart illustrating an example CSI-related procedure.

FIG. 8 illustrates an example of a bitmap-based quantization method to which a method proposed in the disclosure and/or an embodiment is applicable.

FIG. 9 illustrates an example of an energy concentration property for channel information converted based on DCT.

FIG. 10 illustrates an example of a method for setting a valid area for channel information converted in a DCT scheme to which a method proposed in the disclosure and/or an embodiment is applicable.

FIG. 11 illustrates an example of a method for setting a valid area for channel information converted in a DFT scheme to which a method proposed in the disclosure and/or an embodiment is applicable.

FIG. 12 is a flowchart illustrating an example of operations of a UE performing CSI reporting to which a method proposed in the disclosure and/or an embodiment is applicable.

FIG. 13 is a flowchart illustrating operations of a base station and a UE to which a method proposed in the disclosure and/or an embodiment is applicable.

FIG. 14 illustrates a communication system (1) applied to the disclosure.

FIG. 15 illustrates a wireless device which may be applied to the disclosure.

FIG. 16 illustrates a signal processing circuit for a transmit signal.

FIG. 17 illustrates another example of a wireless device applied to the disclosure.

FIG. 18 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
   36.211: Physical channels and modulation
   36.212: Multiplexing and channel coding
   36.213: Physical layer procedures
   36.300: Overall description
   36.331: Radio Resource Control (RRC)
   3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{subframe}^{slots,\mu}-1\}$ within a radio frame. One slot consists of consecutive OFDM symbols of $N_{symb}^\mu$, and $N_{symb}^\mu$ determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l), where k=0, . . . , $N_{RB}^\mu N_{sc}^{RB}-1$) is an index on a frequency domain, and l=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu -1$.

The resource element (k,l) for the numerology μ and the antenna port p corresponds to a complex value $a_{k,l}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n^\mu_{CRB} = \left\lfloor \frac{k}{N^{RB}_{sc}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a wireless channel (or referred to as a link) formed between the UE and the antenna port.

FIG. 7 is a flowchart showing an example of a CSI associated procedure to which a method proposed in the disclosure may be applied.

Referring to FIG. 7, in order to perform one of usages of the CSI-RS, a terminal (e.g., user equipment (UE)) receives, from a base station (e.g., general Node B or gNB), configuration information related to the CSI through radio resource control (RRC) signaling (S710).

The configuration information related to the CSI may include at least one of CSI-interference management (IM) resource related information, CSI measurement configuration related information, CSI resource configuration related information, CSI-RS resource related information, or CSI reporting configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a non-zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 5 shows an example of NZP CSI-RS resource set IE. As shown in Table 5, parameters (e.g., a BM related "repetition" parameter and a tracking related "trs-Info" parameter) representing the usage may be configured for each NZP CSI-RS resource set.

TABLE 5

```
-- ASN1START
-- TAG-NZP-CSI-RS-RESOURCESET-START
NZP-CSI-RS-ResourceSet ::=     SEQUENCE {
    nzp-CSI-ResourcesetId          NZP-CSI-RS-ResourceSetId,
    nzp-CSI-RS-Resources           SEQUENCE (SIZE (1..maxNrofNZP-CSI-RS-
ResourcesPerSet)) OF NZP-CSI-RS-ResourceId,
    repetition                     ENUMERATED { on, off }
    aperiodicTriggeringOffset      INTEGER(0..4)
    trs-Info                       ENUMERATED {true}
    ...
}
-- TAG-NZP-CSI-RS-RESOURCESET-STOP
-- ASN1STOP
```

In addition, the repetition parameter corresponding to the higher layer parameter corresponds to "CSI-RS-ResourceRep" of L1 parameter.

The CSI reporting configuration related information includes a reportConfigType parameter representing a time domain behavior and a reportQuantity parameter representing a CSI related quantity for reporting. The time domain behavior may be periodic, aperiodic, or semi-persistent.

The CSI reporting configuration related information may be expressed as CSI-ReportConfig IE and Table 6 below shows an example of CSI-ReportConfig IE.

TABLE 6

```
-- ASN1START
-- TAG-CSI-RESOURCECONFIG-START
CSI-ReportConfig ::=                       SEQUENCE {
    reportConfigId                             CSI-ReportConfigId,
    carrier                                    ServCellIndex   OPTIONAL, -
- Need S
    resourcesForChannelMeasurement             CSI-ResourceConfigId,
    csi-IM-ResourcesForInterference            CSI-ResourceConfigId   OPTIONAL, -
- Need R
    nzp-CSI-RS-ResourcesForInterference        CSI-ResourceConfigId   OPTIONAL, -
- Need R
    reportConfigType                           CHOICE {
        periodic                                   SEQUENCE {
            reportSlotConfig                           CSI-
ReportPeriodicityAndOffset,
            pucch-CSI-ResourceList                     SEQUENCE (SIZE
(1..maxNrofBWPs)) OF PUCCH-CSI-Resource
        },
        semiPersistentOnPUCCH                      SEQUENCE {
            reportSlotConfig                           CSI-
ReportPeriodicityAndOffset,
            pucch-CSI-ResourceList                     SEQUENCE (SIZE
(1..maxNrofBWPs)) OF PUCCH-CSI-Resource
        },
        semiPersistentOnPUSCH                      SEQUENCE {
            reportSlotConfig                           ENUMERATED {s15, s110, s120,
s140, s180, S1160, s1320},
            reportSlotOffsetList                       SEQUENCE (SIZE (1.. maxNrofUL-
Allocations)) OF INTEGER(0..32),
            p0alpha                                    P0-PUSCH-AlphaSetId
        },
        aperiodic                                  SEQUENCE {
            reportSlotOffsetList                       SEQUENCE (SIZE (1..maxNrofUL-
Allocations)) OF INTEGER(0..32)
        }
    },
    reportQuantity                             CHOICE {
        none                                       NULL,
        cri-RI-PMI-CQI                             NULL,
        cri-RI-i1                                  NULL,
        cri-RI-i1-CQI                              SEQUENCE {
            pdsch-BundleSizeForCSI                     ENUMERATED {n2, n4}
OPTIONAL
        },
        cri-RI-CQI                                 NULL,
        cri-RSRP                                   NULL,
        ssb-Index-RSRP                             NULL,
        cri-RI-LI-PMI-CQI                          NULL
    },
```

The UE measures CSI based on configuration information related to the CSI (S720). The CSI measurement may include (1) a CSI-RS reception process (S721) and (2) a process of computing the CSI through the received CSI-RS (S722). And, detailed descriptions thereof will be described later.

For the CSI-RS, resource element (RE) mapping is configured time and frequency domains by higher layer parameter CSI-RS-ResourceMapping.

Table 7 shows an example of CSI-RS-ResourceMapping IE.

TABLE 7

```
-- ASN1START
-- TAG-CSI-RS-RESOURCEMAPPING-START
CSI-RS-ResourceMapping ::=    SEQUENCE [
    frequencyDomainAllocation    CHOICE (
        row1                         BIT STRING (SIZE (4)),
        row2                         BIT STRING (SIZE (12)),
        row4                         BIT STRING (SIZE (3)),
        other                        BIT STRING (SIZE (6))
    },
    nrofPorts                    ENUMERATED {p1,p2,p4,p8,p12,p16,p24,p32},
    firstOFDMSymbolInTimeDomain  INTEGER (0..13),
    firstOFDMSymbolInTimeDomain2 INTEGER (2..12)
    cdm-Type                     ENUMERATED {noCDM, fd-CDM2, cdm4-FD2-TD2, cdm8-FD2-FD4},
    density                      CHOICE {
        dot5                         ENUMERATED {evenPRBs, oddPRBs},
        one                          NULL,
        three                        NULL,
        spare                        NULL
    {,
    freqBand                     CSI-FrequencyOccupation,
    ...
]
```

In Table 7, a density (D) represents a density of the CSI-RS resource measured in RE/port/physical resource block (PRB) and nrofPorts represents the number of antenna ports.

The UE reports the measured CSI to the eNB (S730).

Here, in the case where a quantity of CSI-ReportConfig of Table 7 is configured to "none (or No report)", the UE may skip the report.

However, even in the case where the quantity is configured to "none (or No report)", the UE may report the measured CSI to the eNB.

The case where the quantity is configured to "none (or No report)" is a case of triggering aperiodic TRS or a case where repetition is configured.

Here, only in a case where the repetition is configured to "ON", the UE may be skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting "CSI-ResourceConfig" includes a configuration for S≥1 CSI resource set (given by higher layer parameter csi-RS-ResourceSetList). Here, the CSI resource setting corresponds to the CSI-RS-resource-setlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to "1" with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConFIG.

When the UE is configured as multiple CSI-ResourceConfigs including the same CSI-IM resource ID, the same time domain behavior is configured with respect to CSI-ResourceConFIG.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are "QCL-TypeD" for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConFIG.

In addition, the time domain behavior of CSI reporting supports periodic, semi-persistent, and aperiodic.
i) The periodic CSI reporting is performed on short PUCCH and long PUCCH. The periodicity and slot offset of the periodic CSI reporting may be configured through RRC and refer to the CSI-ReportConfig IE.
ii) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. SP CSI reporting has activation/deactivation which is the same as or similar to a mechanism having data transmission on SPS PUSCH.

iii) aperiodic CSI reporting is performed on a PUSCH and triggered by DCI. In this case, information related to trigger of aperiodic CSI reporting may be transferred/instructed/configured through MAC-CE.

In the case of AP CSI having an AP CSI-RS, AP CSI-RS timing is set by RRC, and timing for AP CSI reporting is dynamically controlled by DCI.

The NR does not adopt a scheme (for example, transmitting RI, WB PMI/CQI, and SB PMI/CQI in order) of dividing and reporting the CSI in multiple reporting instances applied to PUCCH-based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. And, Z' represents a minimum CSI processing time from the reception of the CSI-RS for channel/interference to the execution of the CSI reporting.

Additionally, the UE reports the number of CSIs which may be simultaneously calculated.

CSI Reporting Using PUSCH

Aperiodic CSI reporting performed on PUSCH supports broadband and subband frequency granularity. Aperiodic CSI reporting performed on PUSCH supports type I and type II CSI.

SP CSI reporting for PUSCH supports type I and type II CSI with wide band and subband frequency granularity. PUSCH resources and modulation and coding scheme (MCS) for SP CSI reporting are semi-permanently allocated by UL DCI.

The CSI report for PUSCH may include part 1 and part 2. Part 1 is used to identify the number of bits of the part 2 information. Part 1 is fully delivered before part 2.

Regarding type I CSI feedback, part 1 includes RI (if reported), CRI (if reported), and CQI of the first code word. Part 2 includes PMI, and when RI>4, part 2 includes CQI.

For Type II CSI feedback, part 1 has a fixed payload size and includes an indication (NIND) indicating the number of non-zero broadband amplitude coefficients for each layer of RI, CQI, and type II CSI. The fields of Part 1-indications for RI, CQI and the number of non-zero broadband amplitude coefficients for each layer—are encoded separately. Part 2 includes the PMI of type II CSI. Part 1 and Part 2 are encoded separately.

When the CSI report includes two parts in the PUSCH and the CSI payload is smaller than the payload size provided by the PUSCH resource allocated for CSI reporting, the UE may omit a part of the second CSI. Part 2 CSI omission is determined according to priority. Priority 0 is the highest priority, and $2N_{Rep}$ is the lowest priority.

CSI Reporting Using PUCCH

The UE may be configured with a plurality of periodic CSI reports corresponding to the CSI report configuration indication composed of one or more higher layers. Here, the associated CSI measurement link and CSI resource configuration are configured via a higher layer.

Periodic CSI reporting in PUCCH format 2, 3 or 4 supports type I CSI based on a wide bandwidth.

Regarding the SP CSI on the PUSCH, the UE transmits the HARQ-ACK corresponding to the PDSCH carrying the selection command in slot n and then performs SP CSI reporting on the PUCCH in slot $n+3N_{slot}^{subframe,\mu}+1$.

The selection command includes one or more report setting indications where the associated CSI resource setting is configured.

The SP CSI report supports type I CSI in PUCCH.

The SP CSI report of PUCCH format 2 supports type I CSI with wide bandwidth frequency granularity. The SP CSI report of PUCCH format 3 or 4 supports type I sub-band CSI and type II CSI with wide bandwidth granularity.

When PUCCH carries type I CSI with wide bandwidth frequency granularity, the CSI payload carried by PUCCH format 2 and PUCCH format 3 or 4 is the same as CRI (when reported) regardless of RI.

In PUCCH format 3 or 4, the type I CSI subband payload is divided into two parts.

The first part (part 1) includes the RI of the first code word, the (reported) CRI, and the (reported) CQI. PMI is included in the second part (part 2), and when RI>4, the CQI of the second code word is included in the second part (part 2).

SP CSI reporting performed in PUCCH format 3 or 4 supports type II CSI feedback, but only part 1 of type II CSI feedback.

In PUCCH format 3 or 4 supporting type II CSI feedback, CSI reporting may depend on UE performance.

The type II CSI report (only Part 1 of them) delivered in PUCCH format 3 or 4 is calculated independently from the type II CSI report performed on the PUSCH.

When the UE is configured with CSI reporting in PUCCH format 2, 3 or 4, each PUCCH resource is configured for each candidate UL BWP.

When the UE receives the active SP CSI reporting configuration on the PUCCH and does not receive a deactivation command, CSI reporting is performed when the CSI reported BWP is an active BWP, otherwise CSI reporting is temporarily stopped. This operation is also applied in the case of SP CSI of PUCCH. For the PUSCH-based SP CSI report, the CSI report is automatically deactivated when a BWP switch occurs.

Depending on the length of the PUCCH transmission, the PUCCH format may be classified as a short PUCCH or a long PUCCH. PUCCH formats 0 and 2 may be referred to as short PUCCHs, and PUCCH formats 1, 3 and 4 may be referred to as long PUCCHs.

In relation to PUCCH-based CSI reporting, short PUCCH-based CSI reporting and long PUCCH-based CSI reporting are described in detail below.

Short PUCCH-based CSI reporting is used only for wideband CSI reporting. Short PUCCH-based CSI reporting has the same payload regardless of the RI/CRI of a given slot to avoid blind decoding.

The size of the information payload may be different between the maximum CSI-RS ports of the CSI-RS configured in the CSI-RS resource set.

When the payload including PMI and CQI is diversified to include RI/CQI, padding bits are added to RI/CRI/PMI/CQI before the encoding procedure for equalizing payloads associated with other RI/CRI values. Further, RI/CRI/PMI/CQI may be encoded as padding bits as needed.

In the case of broadband reporting, long PUCCH-based CSI reporting may use the same solution as short PUCCH-based CSI reporting.

Long PUCCH-based CSI reporting uses the same payload regardless of RI/CRI. For subband reporting, two-part encoding (for type I) is applied.

Part 1 may have a fixed payload according to the number of ports, CSI type, or RI restrictions, and part 2 may have various payload sizes according to part 1.

CSI/RI may be first encoded to determine the payload of the PMI/CQI. Further, CQIi (i=1, 2) corresponds to the CQI for the i-th code word (CW).

For long PUCCH, type II CSI report may only carry part 1.

What has been described above (e.g., 3GPP system and CSI-related operations) may be applied in combination with the methods proposed in the disclosure or may be added up to clarify the technical characteristics of the methods proposed in the disclosure.

In the disclosure, 'A/B' may mean including both or either A and/or B. For ease of description, the following terms are used throughout the disclosure. However, the use of these terms does not limit the technical scope of the disclosure.

CSI: channel state information
UCI: uplink control information
DFT: Discrete Fourier Transform
DCT: Discrete cosine transform
LC: linear combination
WB: wideband
SB: subband
SD: spatial domain
FD: frequency domain
CQI: channel quality information
RI: rank indicator High-resolution feedback methods, such as linear combination (LC) or covariance matrix feedback, for channel state information (CSI) accurate and efficient in light of feedback overhead in the wireless communication environment are being considered. In particular, the new RAT (NR) system considers the 'DFT-based compression' scheme described in Table 8 in a manner of combining (e.g., combining beams based on the amplitude and/or phase) beams with a subband (SB) for $W_1$ constituted of L orthogonal discrete Fourier transform (DFT) beams corresponding to wideband (WB) information.

Table 8 illustrates an example of a DFT-based compression scheme as a Type II CSI overhead reduction (compression) scheme for rank 1-2.

TABLE 8

DFT-based compression

Precoders for a layer is given by size-P × $N_3$ matrix $W = W_1 \tilde{W}_2 W_f^H$
$P = 2N_1N_2$ = #SD dimensions
$N_3$ = #FD dimensions
FFS value and unit of $N_3$
Spatial domain (SD) compression
L spatial domain basis vectors (mapped to the two polarizations, so 2L in total) selected Compression in spatial domain using $$W_1 = \begin{bmatrix} v_0 v_1 \ldots v_{L-1} & 0 \\ 0 & v_0 v_1 \ldots v_{L-1} \end{bmatrix}, \text{ where } \{v_i\}_{i=0}^{L-1}$$

are $N_1N_2$ × 1 orthogonal DFT vectors (same as Rel. 15 Type II)
Frequency-domain (FD) compression
Compression via $W_f = [W_f(0), \ldots, W_f(2L - 1)]$ where $$W_f(i) = [f_{k_i,0} f_{k_i,1} \ldots f_{k_i,M_i-1}], \text{ where } \{f_{k_i,m}\}_{m=0}^{M_i-1} \text{ are } M_i \text{ size-}$$

$N_3$ × 1 orthogonal DFT vectors for SD-component i = 0, . . . , 2L − 1
Number of FD-components $\{M_i\}$ or $\Sigma_{i=0}^{2L-1} M_i$ is configurable, FFS value range
FFS: choose one of the following alternatives
Alt1. common basis vectors: $W_f = [f_{k_0} f_{k_1} \ldots f_{k_{M-1}}]$, i.e. $M_i = M \forall i$ and $\{k_{i,m}\}_{m=0}^{M_i-1}$ are identical (i.e., $k_{i,m} = k_m$, i = 0, . . . , 2L − 1)
Alt2. independent basis vectors: $W_f = [W_f(0), \ldots, W_f(2L - 1)]$, where $W_f(i) = [f_{k_i,0} f_{k_i,1} \ldots f_{k_i,M_i-1}]$, i.e. $M_i$ frequency-domain components are selected
FFS: If oversampled DFT basis or DCT basis is used instead of orthogonal DFT basis
FFS: Same or different FD-basis selection across layers
Linear combination coefficients (for a layer)
FFS if $\tilde{W}_2$ is composed of $K = 2LM$ or $K = \Sigma_{i=0}^{2L-1} M_i$ linear combination coefficients
FFS if only a subset $K_0 < K$ of coefficients are reported (coefficients not reported are zero).
FFS quantization/encoding/reporting structure The above-described scheme indicates representing channel information using the basis or codebook, such as DFT, for information for the spatial domain (SD) and frequency domain (FD) of CSI. The size of the total CSI feedback reported to the base station is affected by the number of combined beams, the amount of quantization for combining coefficient, and the size of the subband and, in CSI feedback, most payloads are generated when the UE reports combination coefficient information, such as $\tilde{W}_2$, to the base station. Here, $\tilde{W}_2$ is composed of linear combination coefficients for SD and FD codebooks in the DFT-based compression scheme.

In particular, when the rank exceeds 1, the SD/FD compression codebook for each layer needs to be designated separately, or since even when the same codebook is applied to all the layers, the channel information is composed of the convolution summation of $\tilde{W}_2$ for the SD and FD codebooks for each layer, the channel information that needs to be fed back also linearly increases as the rank increases. Therefore, if the degree of quantization for the channel information for each layer is always set to be the same without being separately considered, a large loss occurs in terms of the feedback payload.

The channel performance for each layer for the channel between the base station and the UE having multiple antenna ports is influenced by the eigenvalue(s) of the channel and has a different value. Here, the antenna port may be replaced with an antenna element. Hereinafter, for convenience of description, it is referred to as an antenna port. However, the use of these terms does not limit the technical scope of the disclosure. Further, the number of layers is correlated with the number of eigenvalue(s). The channel information may be expressed as the convolution summation of eigenvector(s) corresponding to the eigenvalue(s), and the size of the eigenvalue(s) may be a reference for determining the importance in expressing the channel information. In this case, although the channel information for a higher layer (e.g., layer 3) corresponding to the smallest eigenvalue is expressed with a quantization level relatively lower than the channel information for a lower layer (e.g., layer 0), the loss for the overall channel accuracy may not be significant.

Therefore, in the disclosure, there are proposed a scheme of differentially setting a quantization level for each layer considering the rank/layer upon performing quantization on the complex value information for $\tilde{W}_2$ (matrix of combination coefficients) that needs to be reported from the UE to the base station in Type II CSI reporting and a CSI reporting method based thereupon.

In the disclosure, it is assumed that the Type II CSI codebook (including the enhanced Type II CSI codebook) includes an SD basis-related matrix, an FD basis-related matrix, and a matrix of LC coefficients. Also, the matrix of LC coefficients may include amplitude coefficients and phase coefficients. The codebook may be replaced with, e.g., a precoder or a precoding matrix, and the basis may be replaced with, e.g., a basis vector or a component. For example, the codebook may be represented as $W = W_1 \tilde{W}_2 W_f^H$, where $W_1$ is the SD basis-related matrix, $\tilde{W}_2$ is the matrix of LC coefficients, and $W_f^H$ is the FD basis-related matrix. $\tilde{W}_2$ may be represented by a matrix having a size of 2L×M. Here, 2L denotes the number of SD bases (where, L is the number of beam/antenna ports in SD, and the total number of SD bases may be 2L considering polarization), and M denotes the number of FD bases. Hereinafter, for convenience of description, the following description is based on the Type II CSI codebook.

As an example, the Type II codebook in the situation where the rank is 1 is as illustrated in Equation 3.

[Equation 3]

$$W = \begin{bmatrix} p_1 b_1 \cdots p_L b_L & 0 \\ 0 & p_{L+1} b_1 \cdots p_{2L} b_L \end{bmatrix} \begin{bmatrix} \overline{c_{1,1}} & \overline{c_{1,2}} & \cdots & \overline{c_{1,M}} \\ \overline{c_{2,1}} & \overline{c_{2,2}} & \cdots & \overline{c_{2,M}} \\ \vdots & \vdots & \ddots & \vdots \\ \overline{c_{2L,1}} & \overline{c_{2L,1}} & \cdots & \overline{c_{2L,M}} \end{bmatrix}$$

$$\begin{bmatrix} \exp(-j2\pi\omega_{1,1}) & \exp(-j2\pi\omega_{2,1}) & \cdots & \exp(-j2\pi\omega_{N_3,1}) \\ \exp(-j2\pi\omega_{1,2}) & \exp(-j2\pi\omega_{2,2}) & \cdots & \exp(-j2\pi\omega_{N_3,2}) \\ \vdots & \vdots & \ddots & \vdots \\ \exp(-j2\pi\omega_{1,M}) & \exp(-j2\pi\omega_{2,M}) & \cdots & \exp(-j2\pi\omega_{N_3,M}) \end{bmatrix}$$

The radio channel information may be approximated to information for the convolution summation ($\tilde{W}_2$, a matrix of LC coefficients) of the SD basis-related matrix ($W_1$) and the FD basis-related matrix ($W_f^H$) set or predefined by the UE and the base station, and the UE transmits configuration information for the codebook and $\tilde{W}_2$ to the base station to thereby perform CSI reporting. In this case, the step of quantizing 2LM complex-valued coefficients comprising $\tilde{W}_2$ needs to be preceded, and a scheme therefor may be considered as shown in Table 9 below.

TABLE 9

For each layer, the following alternatives for quantizing each of the coefficients in $\tilde{W}_2$ are to be studied for down selection in RAN1-AH1901
Alt1A. Rel.15 3-bit amplitude; Rel.15 QPSK and 8PSK co-phasing
Alt1B. Rel. 15 3-bit amplitude; Rel.15 QPSK, Rel.15 8PSK, and new 16PSK co-phasing
Alt2A. Rel.15 3-bit wideband amplitude for each beam, 2/3-bit differential amplitude for FD coefficients; Rel.15 QPSK and 8PSK co-phasing
Alt2B. Rel.15 3-bit wideband amplitude for each beam, 2/3-bit differential amplitude for FD coefficients; Rel.15 QPSK, Rel.15 8PSK, and new 16PSK co-phasing
Alt2C. Rel.15 3-bit wideband amplitude + Rel.15 QPSK and 8PSK wideband co-phasing for each beam, 2/3-bit differential amplitude and co-phasing for FD coefficients;
Alt3. A-bit amplitude for each of 2L beams, B-bit amplitude for each of M FD components, 1-
bit differential amplitude and 8PSK co-phasing for each of the 2LM FD coefficients
Alt4. For each beam,
B0-bit amplitude and C0-bit phase for coefficients for the P0 strongest coefficients,
B1-bit amplitude and C1-bit phase for coefficients for the P1 2nd strongest coefficients
. . .
BQ-1-bit amplitude and CQ-1-bit phase for coefficients for the PQ-1 Qth strongest coefficients
Alternatively, amplitude/phase can be replaced with real/imaginary
Alt5. Special case of Alt4: Q = 2, B0 = C0 = 3; B1 = C1 = 2 on amplitude/phase For each layer, one of the schemes shown in Table 9 is determined, and quantization for $\tilde{W}_2$ is performed. Thus, it may be seen that as the number of layers increases, the feedback overhead linearly increases. Therefore, in the disclosure, there are proposed a scheme for differentially setting quantization for $\tilde{W}_2$ (a matrix of LC coefficients) of each layer considering the importance of each layer when the supported rank is 2 or more and a CSI reporting method based thereon.

Hereinafter, the schemes/methods proposed in the disclosure are distinguished from one another for ease of description, and some components of any one scheme/method may be replaced with components of another scheme/method or they may be combined and applied together.

<Proposal 1>

In proposal 1, there is proposed a designing method considering the characteristics for each layer of the channel information in quantizing $\tilde{W}_2$ (a matrix of LC coefficients)

composed of complex values. Quantization of channel information refers to calculating the size and angle of the complex value, which is the channel information coefficient, and then quantizing each of the size and angle.

The UE may report information related to quantization for per-layer channel information (e.g., $\tilde{W}_2 \in C^{2L \times M}$) to the base station. When V=TWTH is defined for channel information (e.g., W) for each layer, and T is an identity matrix or an arbitrary matrix, V is denoted as 'non-transformed CSI' or 'transformed CSI.' Hereinafter, a quantization and CSI feedback method is described for each of 'non-transformed CSI' (case 1) and 'transformed CSI' (case 2).

<Case 1: Non-Transformed CSI>

In the 'non-transformed CSI' scheme, the UE may report quantization bit information for channel coefficients of each layer, and may include quantization bit allocation information for each amplitude and phase of the channel coefficient.

In other words, methods (e.g., method 1 to method 4) in which the UE performs quantization on the coefficients included in $\tilde{W}_2$ of each layer and reports to the base station are described below in detail. When the rank to be supported is 2 or more, the number of quantization bits of the channel information coefficient for each layer may be set to be the same or differ in an explicit or implicit manner.

Method 1: How to Implicitly Set the Number of Quantization Bits

The number of quantization bits for the coefficients may be set based on a correlation between the rank or layer and the number of quantization bits. As the index of the layer increases, the importance of the channel information for the layer becomes relatively smaller. In consideration of this characteristic, it is possible to implicitly set the number of bits for coefficients by setting the set rank or layer index and the number of quantization bits in an inverse proportional relationship. The number of bits that the coefficients of channel information for each layer may have, relative to a specific number (e.g., B) of bits indicated or set, may be set or indicated as a ratio.

The allocation of the number of bits to the amplitude coefficient and the phase coefficient may be set equally/equally to the number of bits of the corresponding coefficient, or may be set as a different ratio. Or, a number of bits may be allocated wideband (WB)-wise for each beam for the amplitude coefficient, and a number of bits may be differentially set subband (SB)-wise in a differential manner.

As a specific example, it is assumed that the B number of bits=4, rank=4, ratio for amplitude=[1, ¾, ²⁄₄, ¼], and ratio for phase=[1, ²⁄₄, ¼, 0]. Therefore, the bits for the amplitude coefficient are {layer index, number of quantization bits}={1,4}, {2,3}, {3,2}, and {4,1}, and the bits for the phase coefficient are {layer Index, number of quantization bits}={1,4}, {2,2}, {3,1}, and {4,0}.

For example, the ratio for amplitude and the ratio for phase may be predefined between the UE and the base station. When the number of bits and the rank are set by the base station or the UE, it is possible to know the number of quantization bits for the amplitude coefficient and the phase coefficient for each layer. As another example, a plurality of ratios for amplitude and ratios for phase may be set/defined, and one of the plurality may be selected using the index. When the number of bits, rank, and index are set by the base station or the UE, it is possible to know the number of quantization bits for the amplitude coefficient and phase coefficient for each layer.

Since the implicit setting method through the above-described method 1 uses a specific method or relationship for the channel coefficients to be quantized, the bit overhead for quantization setting may be reduced and, in particular when a specific bit number B or rank is large, may be more efficient.

Method 2: How to Explicitly Set the Number of Quantization Bits

Unlike method 1 described above, the number of quantization bits for each layer may be explicitly set. Further, in a situation where the number of quantization bits for each layer is given, a bit number may be differentially allocated depending on the amplitude of the coefficients in the layer.

As a specific example, quantization bit numbers may be explicitly set, like {layer index, bits for amplitude, bits for phase}={1,3,3}, {2,2,3}, {3,2,2}, and {4,1,2}. As an example, the layer index, bit number for amplitude coefficient, and bit number for phase coefficient may be explicitly set/defined between the UE and the base station. As another example, the base station may explicitly indicate, to the UE, the layer index, bit number for amplitude coefficient, and bit number for phase coefficient via CSI-related configuration information. Alternatively, the UE may report the layer index, bit number for amplitude coefficient, and bit number for phase coefficient when reporting CSI.

Since the above-described method 2 may specify the degree of quantization of channel coefficients for each layer, the channel quality and importance of the corresponding layer may be more flexibly reflected, and thus an accurate channel may be configured.

Method 3: How to Set Bit Number Via Mode Setting

Method 3 is a hybrid configuration of bit number setting methods of implicit method 1 and explicit method 2, and the operation of allocating a bit number for the amplitude and phase of each coefficient may be preset as multiple modes as shown in Table 10 below. Table 10 shows example bit number setting modes of amplitude and phase. Table 10 is intended merely for illustration purposes but not for limiting the technical scope of the disclosure.

TABLE 10

|        | Amplitude | Phase  |
|--------|-----------|--------|
| Mode 1 | 'Fix'     | 'Diff' |
| Mode 2 | 'Diff'    | 'Diff' |
| Mode 3 | 'Diff'    | 'Fix'  |
| Mode 4 | 'Fix'     | 'Fix'  |

Referring to Table 10, when the amplitude or phase is in the 'Fix' state, a quantization bit number may be designated from the base station or set by the UE. When the amplitude or phase is in the 'Diff' state, a quantization bit number may be set or a separate bit allocation method may be set based on, e.g., method 1. For example, rather than a ratio or bit number being explicitly set per layer, bits may be differentially allocated considering the layer index.

As shown in Table 10, there may be four modes in quantizing the coefficients (amplitude coefficients and phase coefficients) of $\tilde{W}_2$. For example, 'mode 4' indicates applying a specific quantization scheme (e.g., Alt1 to Alt5) to all the layers and setting to the same quantization level as discussed above in connection with Table 9.

As a specific example, it is assumed that bit number B=4, rank=4, mode=1, ratio=[1, ¾, ²⁄₄, ¼], and 'even.' Here, 'even' means setting equally/evenly. In other words, for a given B value, the bits of the corresponding coefficient for each layer may be equally assigned as B. In 'mode=1', the amplitude is 'Fix', so the bit for amplitude coefficient may be represented as {layer index, quantization bit number}={1,4}, {2,4}, {3,4}, and {4,4}, and the bit for phase coefficient is 'Diff', so {layer index, quantization bit number}={1,4}, {2,3}, {3,2}, and {4,1}.

Since the mode of the explicit or implicit quantization scheme may be selectively set through the above-described method 3, it may be efficient in a situation in which a setting parameter for performing quantization is dynamically set.

Method 4: How to Set a Quantization Bit Number Based on Bitmap (Method 4 may also be used for a method for setting a valid area of case 2 to be described below.)

For the $\tilde{W}_2$ (2L×M size) channel information (LC coefficient) for each layer, a quantization bit number may be set differently for each coefficient. In this case, a bitmap for the SD/FD of channel information may be set or indicated to select channel coefficient(s), and multiple bitmap group numbers may also be set. As an example, a bitmap of the 2L×M size (e.g., the same size as $\tilde{W}_2$) may be set to select channel coefficient(s). Alternatively, a pre-defined bitmap or table where the UE or base station is aware of the information may be utilized.

For example, bitmap information may be set respectively for the row (e.g., spatial domain SD)) or column (e.g., frequency domain (FD)) of the channel information, and selection of coefficient(s) therefor may be possible by a method, such as union or intersection. In this case, if the bitmap information for either dimension is not specified, it may be operated, with all the bitmap values being '1s.' Alternatively, the bitmap setting unit may be set as a specific value, rather than the current (one row/one column), and use of a predefined area with respect to a set position may present the effect of reducing the bitmap setting size.

In this case, information regarding the number of coefficient(s) selected through the bitmap (e.g., $K_0$) may be reported separately or calculated using the bitmap setting and used for SD/FD codebook setting (e.g., Part 1 CSI).

The quantization bit number of the channel coefficient(s) designated through the bitmap or the bitmap may be set to be the same or differ for each layer. If different, the corresponding information for each layer may be set based on the implicit or explicit method. An example of the implicit operation may be to differentially set bit allocation according to whether a bitmap is selected for each layer or within a specific layer in a situation where the quantization bits of amplitude and phase are B.

FIG. 8 illustrates a bitmap-based quantization method to which a method proposed in the disclosure is applicable. FIG. 8 is intended merely for illustration purposes but not for limiting the technical scope of the disclosure. In FIG. 8, it may be assumed that L=2, M=6, SD bitmap=(1101), FD bitmap=(110110), and 'intersection'. In FIG. 8, the intersection of the SD bitmap and the FD bitmap may be expressed as 'ON', and the remaining portions except for the intersection may be expressed as 'OFF'. For example, such information as the SD bitmap and the FD bitmap may be reported by the UE to the base station. Alternatively, it may be predefined between the UE and the base station.

For example, in a situation where Rank=2 and 'bitmap for the same layer', {layer index, state, bits for amplitude, bits for phase}={1, 'ON', 4, 4}, {1, 'OFF', 3, 3}, {2, 'ON', 3, 3}, and {2, 'OFF', 2, 2}.

Since it is possible to differentially set the quantization level of channel coefficient(s) even in the same layer and set a coefficient index and area affecting channel accuracy via bitmap setting based on the above-described method, quantization effects per layer/between layers may be significantly enhanced. In other words, a different quantization bit number may be set per layer/per coefficient for $\tilde{W}_2$ (2L×M) channel information of each layer based on the bitmap.

<Case 2: Transformed CSI>

Unlike the conventional CSI codebook design, the enhanced Type II CSI codebook adds the operation of compressing channel information for multiple adjacent or contiguous subbands (SB) in the frequency domain (FD). Therefore, if a quantization scheme is designed considering influence by the correlation in terms of FD, it is possible to reduce payload at higher efficiency. Thus, 'transformed CSI' reporting of case 2 is proposed. In other words, since if a specific transform is performed on channel information, valid value(s) are concentrated in a specific area(s) of the transformed channel information, it is possible to set a different quantization level for the valid component of channel coefficients per layer using the transformed channel information. For example, more quantization bits are allocated to the coefficients included in the valid area to raise accuracy, and less bits are allocated to the remaining coefficients and quantization is performed or processing may be performed in such a manner as setting to 0.

As an example transform scheme, discrete cosine transform (DCT) is Fourier-based transform scheme that may represent/convert the signal and image information represented as a real value into information for the frequency domain. In this case, the signal information exhibits the energy concentration property in which the signal information concentrates onto lower frequency components by the properties of DCT, and this trend increases as the degree of correlation of the information increases. Accordingly, since specific information may be represented using partial values corresponding to the lower frequency component as an advantage of DCT, a high efficiency may be achieved in quantizing or reporting information. Equation 4 is a DCT matrix C for transformation of two-dimensional signal information M expressed in a matrix.

$$[C]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases}$$ [Equation 4]

$$m = 0, \ldots, M-1$$

In this case, the transformed signal information V may be calculated as $V=CMC^T$. Even when reconstructing the original signal from the transformed signal, the $M=C^T VC$ scheme may be performed through DCT matrix C.

FIG. 9 illustrates an example of an energy concentration property for channel information converted based on DCT. If DCT is performed on the image information (8×8) or signal represented as a real value on the left of FIG. 9, the result on the right may be obtained. In other words, transformed major values are concentrated in the lower frequency domain, and the values of the components may be significantly reduced as the frequency increases.

DCT is only one of various transform schemes, and does not limit the technical scope of the disclosure. Various methods other than DFT and DCT may be used for channel transform schemes in the disclosure.

Accordingly, a method of differentially performing quantization may be taken into account considering the channel information transform scheme.

As the 'transformed CSI' scheme of case 2, the UE may include and report one or more of information i) to information iii) as follows. i) channel transform information for each layer, ii) valid value or valid area setting information for transform channel for each layer, where the amplitude and order information for the valid value for the transform channel may be included. iii) quantization bit information for each valid area, where the quantization bit allocation information for each phase and amplitude of the transform channel coefficient corresponding to the valid area may be set separately or based on the 'non-transformed CSI' method of case 1. Information i) to information iii) are described below in detail.

i) Channel Transform Information for Each Layer

Since the valid values (valid coefficients) of channel information are affected by the position and range according to the properties of the transformation matrix (e.g., DFT, DCT, orthogonal basis, etc.), it may be indicated or set to allow the UE and the base station to share the channel transformation information. Alternatively, the transformation matrix may use a prespecified matrix. As an embodiment to which a transformation matrix is applied, the matrix $\overline{X}$ transformed for channel information matrix X (M by K) and transformation matrixes T1 and T2 may be represented as $\overline{C}=T_1^H X T_2$, and each corresponding information may be set or indicated.

ii) Valid Value for Transformation Channel for Each Layer or Valid Area Configuration Information The CSI feedback valid range configuration information may distinguish operations according to the estimation scheme indicated by the UE or base station, based on the channel information transformed based on the channel transformation information (e.g., transformation matrix information). For example, if the amplitude of each coefficient is smaller than a specific threshold, it may be processed as 0, and if it is larger than or equal to the specific threshold, it may be regarded as a valid value, and the presence or absence of a valid value may be set.

FIG. 10 illustrates an example of a method for setting a valid area for channel information converted in a DCT scheme to which a method proposed in the disclosure and/or an embodiment is applicable. It is assumed in FIG. 10 that channel information is expressed as a 9×9 matrix. FIG. 10 is intended merely for illustration purposes but not for limiting the technical scope of the disclosure.

Referring to FIG. 10, the real or imaginary part of the channel information (e.g., size of 9×9) may be extracted and DCT is applied with a transformation matrix, and then, information for the valid may be extracted based on a threshold. The valid component of the real/imaginary part of the channel information may be effectively extracted using the energy concentration property of DCT. Pi denotes the index of the valid area (i.e., the ith valid area) (where i may be separately set by the UE/base station or may be a predefined value) and, in this case, the number of Pi's for each layer/range for each Pi may be set to be identical or differ. As an example, if rank=2, and 'DCT', {layer index, number of Pi's, range} may be represented as {1, 4, [3,2, 2,2]}, {2, 2, [2,7]}.

The above-described method may be very advantage in that the quantization of coefficient is set to differ in the layer since the meaningful channel coefficients for each layer are concentrated in the lower frequency domain (e.g., P0 domain) by the energy concentration property of DCT.

FIG. 11 illustrates an example of a method for setting a valid area for channel information converted in a DFT scheme to which a method proposed in the disclosure and/or an embodiment is applicable. It is assumed in FIG. 11 that channel information is expressed as a 9×9 matrix. FIG. 11 is intended merely for illustration purposes but not for limiting the technical scope of the disclosure.

Referring to FIG. 11, the valid area may be set with the position for a specific element of the channel information matrix and a specific range with respect to the position. As an example, the specific element may mean one of the valid values, and the position for the specific element may be represented as the index (e.g., index in matrix) of one of the valid values. The specific range may have a radius R of the position of the specific element or may be set as, e.g., an R×R area. Alternatively, the valid area may be set with respect to the position of the specific element reported by designating the areas agreed between the base station and the UE with indexes.

The UE may report information for the area where the valid component exists, i.e., the position of the specific element and the range information for the valid area, and in this case, the number/range of the valid positions for each layer may be set to be identical or different. For example, if rank=2, 'DFT', and 'R×R size', {layer index, position, R}={1, (2,2), 5} or {2, (6,6), 3}. As an example, the UE may report information (e.g., R value or range-related index) related to the layer index, the position of the specific element (index in matrix), and the valid area.

DCT is a real value transform and needs to transform each of the real part and the imaginary part for the channel coefficients. In contrast, DFT is a complex transform and may directly apply to the matrix of channel coefficients and provides advantages in terms of processing.

iii) Quantization Bit Information for Each Valid Area

For the channel information where a specific transform has been performed on each layer, quantization bit allocation information for each phase and amplitude of the transform channel coefficient corresponding to the valid area may be set by a separate operation or based on methods 1 to 4 of case 1 described above.

A designated/set quantization method for each layer may be performed on the channel coefficients of the portion which belongs to the valid area, and the values in the remaining area may be replaced with 0's or a quantization method for the other portion than the valid area may be explicitly/implicitly set.

As an example, in a situation where the transform is set to 'DCT', the quantization bit information for the area indicated by P0 to P3 of the first layer may be set, such as {Pi, bit for amplitude, bit for phase}={P0, 3, 3}, {P1, 3, 2}, {P2, 2, 2}, and {P3, 0, 0}. The UE may quantize each of the amplitude coefficient and the phase coefficient of the P0 area with 3 bits and report it to the base station and, for the amplitude coefficient and phase coefficient of the P3 area, may not report it since they are 0 bits.

The method and/or embodiments of the above-mentioned proposal 1 may be extended and applied to CSI reporting by the UE operating with a plurality of TRPs (multi-TRP). For example, the layer of the above-mentioned proposal 1 may correspond to each TRP. Hereinafter, for convenience of description, it is assumed that two TRPs (e.g., TRP1 and TRP2) operate. However, this assumption does not limit the technical scope of the disclosure. Here, TRP may be replaced with, e.g., TP or base station.

When reporting CSI for TRP1 and TRP2, quantization may be performed on each CSI report.

For example, based on method 1 of proposal 1 described above, quantization bit numbers for CSI report for TRP1 and CSI report for TRP2 may be implicitly set. The quantization bit number of each CSI report may be set as a ratio. For example, based on method 2 of proposal 1 described above, quantization bit numbers for CSI report for TRP1 and CSI report for TRP2 may be explicitly set. For example, based on method 3 of proposal 1 described above, quantization bit numbers for CSI report for TRP1 and CSI report for TRP2 may be defined/set per mode. For example, based on method 4 of proposal 1 described above, quantization bit numbers for CSI report for TRP1 and CSI report for TRP2 may be set in the form of a bitmap.

For example, for the CSI report for TRP1 and the CSI report for TRP2 based on case 2 of proposal 1 described above, at least one of i) channel transformation information for each CSI report, ii) the valid value or valid area configuration information for the transform channel for each CSI report (in this case, the amplitude and order information for the valid value for the transform channel may be included), or iii) quantization bit information for each valid area may be included.

<Proposal 2>

As described above, in enhanced Type II CSI, unlike the conventional scheme, channel information may be configured with $\tilde{W}_2 \in C^{2L \times M}$ that is linear combination information for the SD basis and FD basis based on the SD basis and FD basis for each layer. Accordingly, there is a need for designing UCI appropriate for the enhanced Type II CSI codebook further considering the parameter and indicator required in channel configuration and decoding.

When reporting CSI using the Type II CSI codebook, UCI may include Part1 CSI and Part2 CSI.

Part 1 CSI may include at least one of settings/modes for quantization, an indication $N_S$ (the $N_S$ value may be set or indicated from the range: $1 \leq N_S \leq 2L$) for the number of strong coefficients among $K_0$ coefficients, indication $K_{NZ}$ ($\leq K_0$) for the number of non-zero coefficients in $W_2$.

Part 2 CSI may include at least one of indices for $N_S$ coefficients (e.g., ceil(log 2 $K_0$)), bitmap indication for $K_{NZ}$. Specifically, the bitmap indication for $K_{NZ}$ may follow unrestricted, pol-common, and restricted schemes. For example, in the unrestricted scheme, the bitmap may have a size of 2L×M. Further, when the corresponding indication is included in Part1 CSI, it replaces $K_{NZ}$ and $N_S$ of Part1 CSI. When $N_S$ is 1, the corresponding index may be included in Part1 CSI.

For example, the bitmap indication for the $K_{NZ}$ may correspond to the bitmap of the 2L×M size for the coefficients of the above-described $\tilde{W}_2 \in C^{2L \times M}$ and may be reported through Part 2 CSI (i.e., UCI part 2). Since the size of the bitmap may be variable, it may be preferable to report through Part 2 CSI having a variable size rather than Part 1 CSI having a fixed size. As a specific example, channel coefficient(s) (e.g., non-zero coefficients) may be selected/indicated that are reported based on the bitmap set with the product of the number (e.g., 2L) of bases of the spatial domain and the number (e.g., M) of bases of the frequency domain.

The size of Part1 CSI may be fixed (static), and Part2 CSI may be variable (dynamic). Part1 CSI is configured with a value that may determine the size of Part2 CSI. In this case, all or some of the components in each part included in the conventional Rel-15 UCI may be included.

Further, in selecting the basis/coefficient subset for the first layer, the design of the subset whose size is $K_0$ may be selected from among i) an unrestricted subset (size=2LM), ii) a polarization-common subset (size=LM), or iii) a restricted subset (size=2L+M, for the FD basis and the subset of given beams). The value of $K_0$ may be represented as $K_0 = \lceil \beta \times 2LM \rceil$, where $\beta$ of two values may be supported. $\beta \in \{\frac{1}{8}, \frac{1}{4}, \frac{1}{2}, \frac{3}{4}\}$ may be selected from UCI consists of two parts. Information related to the number(s) of non-zero coefficients is reported in UCI part 1. This does not mean whether the information consists of a single value or multiple values. Further, the payload of UCI part 1 remains the same for other RI value(s). The bitmap is used to represent non-zero coefficient indices.

The LC coefficient associated with the beam $l \in \{0, 1, \ldots, 2L-1\}$ and frequency units $m \in \{0, 1, \ldots, M-1\}$ is represented as $c_{l,m}$, and the strongest coefficient (among $K_{NZ}$ non-zero coefficients reported using the bitmap) is represented as $c_{l^*,m^*}$. The following alternatives have been clarified/simplified.

Alt1 (per coefficient analogous to Rel.15 Type II $W_2$): Rel.15 3-bit amplitude, N-bit phase, where N is set (may be set) to 2 (QPSK), 3 (8PSK), or 4 (16PSK). For the strongest coefficient index ($l^*$, $m^*$), $\lceil \log_2 K_{NZ} \rceil$-bit indicator is reported.

Alt2' (combined): the UE may report the following for quantization of coefficients in $\tilde{W}_2$.
  i) Strongest coefficient indicator: $\lceil \log_2 K_{NZ} \rceil$ bit, where $K_{NZ}$ is equal to the number of NZ coefficients reported using the bitmap. The strongest coefficient is expressed as 1 (thus its amplitude/phase is not reported)
  ii) Two reference amplitudes (for two polarizations): For the polarization of the strongest coefficient, the reference amplitude is 1 (thus not reported). For the other polarizations, the reference amplitude is quantized to A (A=4 or 3) bits. For A=4, the alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0 \right\}$$

(−1.5 dB step size) and, for A=3, the alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{6}}\right)^{\frac{1}{4}}, 0 \right\}$$

(−1.5 dB step size).
  iii) The differential amplitudes of the coefficients w.r.t. the reference amplitude in this polarization) are quantized to B (B=2 or 3) bits.
For B=2, the alphabet is $$\left\{ 1, \frac{1}{\sqrt{2}}, \frac{1}{4}, \frac{1}{2\sqrt{2}} \right\}$$

(−3 dB step size) and, for B=3, the alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}$$

(−3 dB step size).
  iv) (A, B) may be set from among (4, 2), (4, 3), and (3, 2).
  v) Each phase is quantized to C=3 bits (8PSK) or 4 bits (16PSK) and may be set.

Alt3. The coefficient matrix $\tilde{W}_2$ (2L-by-M matrix) may be expressed as a product of three matrices (=ABC). A and C are real-valued diagonal matrices, and B is a coefficient matrix. The amplitude set of B is {0,1}. The amplitude sets of A and C are: i) Alt 3A: 3 bit R15 amplitude set for A and C or ii) Alt 3B: 3 bit R15 amplitude set for A and new 2 bit amplitude set {0, ¼, ½, 1} for C.

Alt4. For each beam l: 4-bit amplitude and 16PSK phase for the coefficients of the first FD component; 3-bit amplitude and 8PSK phase for the remaining coefficients.

Alt4M (Modified Alt4).

$\{c_{l,m}, l \neq l^*\}$ For: For 4-bit amplitude and 16PSK phase, $\{c_{l,m}, m \neq m^*\}$, 3-bit amplitude and 8PSK or 16PSK phase (settable), for strongest coefficient index ($l^*$, $m^*$), $\lceil \log_2 K_{NZ} \rceil$-bit indicator is reported.

Table 11 shows alternative(s) to the W2 channel information configuration of enhanced Type II CSI feedback being discussed in NR MIMO. By utilizing the proposed new UCI design, CSI reporting based on each method may be effectively performed. For example, it is assumed that L=4, M=7, beta={¼, ½}→KNZ=beta*2*L*M={14, 28}.

TABLE 11

| | Embodiments | Alt1 | Alt2 | Alt3 | Alt4 |
|---|---|---|---|---|---|
| Part1 CSI | $K_0$ | 14 | 14 | 14 | 14 |
| | $N_S$ | — | — | — | 2 |
| | ConFIG. | 4-bit for phase | 4-bit for phase | 4-bit for phase | Strong-(4, 4) Else-(3, 4) |
| Part2 CSI | Bitmap Idx for Ns | unrestricted — | unrestricted — | unrestricted — | unrestricted {2, 8} |

UCI for Type II CSI reporting may be newly designed through the above-described proposed method (e.g., proposal 1 or proposal 2), and it is possible to perform effective CSI reporting from the viewpoint of payload reduction by performing quantization considering RI/layer.

FIG. 12 is a flowchart illustrating operations of a UE reporting channel state information to which a method and/or embodiment proposed in the disclosure may be applied. FIG. 12 is intended merely for illustration purposes but not for limiting the scope of the disclosure. Referring to FIG. 12, the UE and/or base station are assumed to operate based on proposals 1 and 2 and/or embodiments described above. Further, the CSI-related operations of FIG. 7 may be referenced/used in the operations of the UE and/or the base station. Some of the steps described in FIG. 12 may be combined or omitted.

The UE may receive CSI-related configuration information from the base station (S1210). The CSI-related configuration information may include codebook-related information.

For example, the codebook may include at least one of spatial domain-related information, frequency domain-related information, or information for a linear combination coefficient. Further, the codebook may be configured based on a layer or a rank indicator (RI).

For example, the operation of receiving the CSI-related configuration information from the base station (100/200 of FIGS. 14 to 18) by the UE (100/200 of FIGS. 14 to 18) in the above-described step S1210 may be implemented by a device as illustrated in FIGS. 14 to 18 described below. For example, referring to FIG. 15, one or more processors 202 may control one or more transceivers 206 and/or one or more memories 204 to receive the CSI-related configuration information, and one or more transceivers 206 may receive the CSI-related configuration information from the base station.

The UE may receive a reference signal (RS) from the base station (S1220). The reference signal may be received based on the CSI-related configuration information. The reference signal may be periodically, semi-persistently, or aperiodically transmitted from the base station.

For example, the operation of receiving the reference signal from the base station (100/200 of FIGS. 14 to 18) by the UE (100/200 of FIGS. 14 to 18) in the above-described step S1220 may be implemented by a device as illustrated in FIGS. 14 to 18 described below. For example, referring to FIG. 15, one or more processors 202 may control one or more transceivers 206 and/or one or more memories 204 to receive the reference signal, and one or more transceivers 206 may receive the reference signal from the base station.

The UE may perform CSI measurement/calculation based on the reference signal (S1230).

For example, the operation of measuring/calculating the CSI based on the reference signal by the UE (100/200 of FIGS. 14 to 18) in the above-described step S1230 may be implemented by a device as illustrated in FIGS. 14 to 18 described below. For example, referring to FIG. 15, one or more processors 202 may control one or more transceivers 206 and/or one or more memories 204 to measure/calculate the CSI based on the reference signal.

The UE may transmit CSI to the base station (S1240). The CSI may be transmitted through uplink control information (UCI) including a first part and a second part. A size of the second part may be set based on at least one piece of information included in the first part.

The CSI may be a CSI report based on a Type II codebook. For example, the codebook (or precoder, or precoding matrix) may include at least one of spatial domain-related information (e.g., SD basis matrix), frequency domain-related information (e.g., FD basis matrix), or linear combination coefficient-related information (e.g., a linear combination coefficient matrix). As an example, the codebook (or precoder, or precoding matrix) may be represented as $W = W_1 \tilde{W}_2 W_f^H$, where $W_1$ may denote the SD basis-related matrix, $\tilde{W}_2$ may denote the matrix of linear combination coefficients, and $W_f^H$ may denote the FD basis-related matrix. $\tilde{W}_2$ may be expressed as a matrix having a size of {number 2L of SD bases×number M of FD bases}. As an example, a first matrix (e.g., a matrix of linear combination coefficients) may include an amplitude coefficient and a phase coefficient, and the first matrix may correspond to a linear combination of a second matrix (e.g., an SD basis-related matrix) including a basis of a spatial domain and a third matrix (e.g., an FD basis-related matrix) including a basis of a frequency domain.

The CSI may include information related to the codebook (or a precoder or a precoding matrix). The information related to the codebook may include a bitmap related to the amplitude coefficient and the phase coefficient, and a size of the bitmap may be configured as the product of the number of bases of the spatial domain for the CSI and the number of bases of the frequency domain for the CSI. For example, the bitmap may have a size {number 2L of bases of spatial domain×number M of bases of frequency domain} of the bitmap. For example, the bitmap may be set for each layer. For example, the bitmap may be included in the second part (e.g., UCI part2 or Part2 CSI) of the UCI and reported to the base station.

Further, the information related to the codebook may further include information related to the amplitude coefficient and information related to the phase coefficient, and wherein The bitmap may indicate whether the information related to the amplitude coefficient and the information related to the phase coefficient are reported.

As the rank or layer increases, the payload for the matrix of linear combination coefficients to be fed back increases. Thus, quantization may be performed on the amplitude coefficient and phase coefficient so as to reduce the feedback overhead. The quantization may be performed for each layer. For example, the step of quantizing the amplitude coefficient and the phase coefficient may be performed together with step S1230 described above. Alternatively, it may be performed after step S1230 and before step S1240.

For example, the quantization level and index of layer may be inversely proportional to each other. In other words, as the index of the layer increases, the number of bits for reporting coefficients for the layer may decrease.

The CSI may further include information related to quantization.

For example, the UE may quantize the channel coefficients (i.e., amplitude coefficients and phase coefficients) of each layer and report quantization bit allocation information for the coefficients to the base station. As an example, the information related to the quantization may include information for the index of the layer, information for a bit number of the amplitude coefficient, and information for a bit number of the phase coefficient. As an example, the bit number for per-layer channel coefficients (amplitude coefficients and phase coefficients) for a specific bit number indicated or set may be set as a ratio.

For example, if quantization is performed for each layer, the information related to the quantization may include at least one of i) channel transform information for each layer, ii) valid value or valid area information for a transformed channel per layer, or iii) quantization bit information per valid area. For example, the channel transformation information may indicate the transformation matrix (e.g., DFT, DCT, orthogonal basis matrix) used for channel transformation. As an example, the other values than the valid value may be the case where the phase coefficient or amplitude coefficient is smaller than a specific threshold and may be processed/set to '0.' As an example, the valid area information may be set as a predetermined range with respect to a low frequency. Alternatively, an arbitrary range may be set with respect to a specific element. For example, the valid area information may be represented as an index and range of a specific element (e.g., one of the valid values) of the linear combination coefficient. Further, quantization bits for the amplitude coefficient and phase coefficient may be allocated for each valid area.

For example, the information related to the quantization may include bitmap information for the quantization per layer. As an example, each bitmap information for the row (e.g., spatial domain (SD) of the channel information or the column (e.g., frequency domain (FD)) may be included. For example, it may be set in the form of intersection or union of bitmap sequences for the row and column. Different bitmap information may be set for each layer. Or, the bitmap information is information that is common to each layer but separately indicates the intersection portion and the union portion, and information to be reported for each layer may be set to differ.

For example, a plurality of modes for a quantization bit setting scheme may be predefined between the UE and the base station, and information related to quantization may include indication information for the mode used for quantization. For example, since 'Fix' or 'Diff' may be set as a quantization scheme for each of the amplitude coefficient and the phase coefficient, four modes in total may be defined. The total number of modes that may be defined may vary depending on the type of coefficient or the number of quantization schemes. For 'Fix', a specific bit number set by the base station or UE may be used and, for 'Diff', a ratio may be used.

Further, as an example, the first part (e.g., part1 CSI) of UCI may include at least one of an indication for the number of non-zero coefficients of the matrix (e.g., the first matrix) of linear combination coefficients, $N_S$ (as the $N_S$ Value, a Range of $1 \leq N_S \leq 2L$ May be Set or Indicated), which is an indication for the number of strong coefficients among the coefficients, or a setting/mode for quantization. The second part (e.g., part2 CSI) of UCI may include at least one of a bitmap indication for non-zero coefficients or indices for NS coefficients.

For example, the operation of transmitting CSI to the base station (100/200 of FIGS. 14 to 18) by the UE (100/200 of FIGS. 14 to 18) in the above-described step S1240 may be implemented by the device of FIGS. 14 to 18 described below. For example, referring to FIG. 15, one or more processors 202 may control one or more transceivers 206 and/or one or more memories 204 to transmit CSI, and one or more transceivers 206 may transmit the CSI to the base station.

FIG. 13 is a flowchart illustrating operations of a base station receiving channel state information to which a method and/or embodiment proposed in the disclosure may be applied. FIG. 13 is intended merely for illustration purposes but not for limiting the scope of the disclosure. Referring to FIG. 13, the UE and/or base station are assumed to operate based on proposals 1 and 2 and/or embodiments described above. Further, the CSI-related operations of FIG. 7 may be referenced/used in the operations of the UE and/or the base station. Some of the steps described in FIG. 13 may be combined or omitted.

The base station may transmit CSI-related configuration information to the UE (S1310). The CSI-related configuration information may include codebook-related information.

For example, the codebook may include at least one of spatial domain-related information, frequency domain-related information, or information for a linear combination coefficient. Further, the codebook may be configured based on a layer or a rank indicator (RI).

For example, the operation of transmitting the CSI-related configuration information from the UE (100/200 of FIGS. 14 to 18) by the base station (100/200 of FIGS. 14 to 18) in the above-described step S1310 may be implemented by a device as illustrated in FIGS. 14 to 18 described below. For example, referring to FIG. 15, one or more processors 202 may control one or more transceivers 206 and/or one or more memories 204 to transmit the CSI-related configuration information, and one or more transceivers 206 may transmit the CSI-related configuration information to the UE.

The base station may transmit a reference signal (RS) to the UE (S1320). The reference signal may be transmitted based on the CSI-related configuration information. The reference signal may be periodically, semi-persistently, or aperiodically transmitted from the base station.

For example, the operation of transmitting the reference signal to the UE (100/200 of FIGS. 14 to 18) by the base station (100/200 of FIGS. 14 to 18) in the above-described step S1320 may be implemented by a device as illustrated in FIGS. 14 to 18 described below. For example, referring to FIG. 15, one or more processors 202 may control one or more transceivers 206 and/or one or more memories 204 to transmit the reference signal, and one or more transceivers 206 may transmit the reference signal to the UE.

The base station may receive the CSI from the UE (S1330). The CSI may be received through uplink control information (UCI) including a first part and a second part. A size of the second part may be set based on at least one piece of information included in the first part.

The CSI may be a CSI report based on a Type II codebook. For example, the codebook (or precoder, or precoding matrix) may include at least one of spatial domain-related information (e.g., SD basis matrix), frequency domain-related information (e.g., FD basis matrix), or linear combination coefficient-related information (e.g., a linear combination coefficient matrix). As an example, a first matrix (e.g., a matrix of linear combination coefficients) may include an amplitude coefficient and a phase coefficient, and the first matrix may correspond to a linear combination of a second matrix (e.g., an SD basis-related matrix) including a basis of a spatial domain and a third matrix (e.g., an FD basis-related matrix) including a basis of a frequency domain.

The CSI may include information related to the codebook (or a precoder or a precoding matrix). The codebook-related information may include a bitmap related to the amplitude coefficient and the phase coefficient, and the size of the bitmap may be set as the product of the number of bases of the spatial domain for the CSI and the number of bases of the frequency domain for the CSI. For example, the bitmap may have a size {number 2L of bases of spatial domain×number M of bases of frequency domain} of the bitmap. For example, the bitmap may be included in the second part (e.g., UCI part2 or Part2 CSI) of the UCI and reported to the base station. For example, the bitmap may be set for each layer.

Further, the information related to the codebook may further include information related to the amplitude coefficient and information related to the phase coefficient, and wherein The bitmap may indicate whether the information related to the amplitude coefficient and the information related to the phase coefficient are reported.

The amplitude coefficient and the phase coefficient may be quantized to reduce the payload for the matrix of linear combination coefficients to be fed back. The CSI may further include information related to quantization.

For example, the information related to the quantization may include information for the index of the layer, information for a bit number of the amplitude coefficient, and information for a bit number of the phase coefficient. As an example, the bit number for per-layer channel coefficients (amplitude coefficients and phase coefficients) for a specific bit number indicated or set may be set as a ratio. For example, as the index of the layer increases, the bit number of coefficients for the layer may decrease.

For example, the information related to the quantization may include at least one of i) channel transform information for each layer, ii) valid value or valid area information for a transformed channel per layer, or iii) quantization bit information per valid area. For example, the channel transformation information may indicate the transformation matrix (e.g., DFT, DCT, orthogonal basis matrix) used for channel transformation. As an example, the other values than the valid value may be the case where the phase coefficient or amplitude coefficient is smaller than a specific threshold and may be processed/set to '0.' As an example, the valid area information may be set as a predetermined range with respect to a low frequency. Alternatively, an arbitrary range may be set with respect to a specific element. For example, the valid area information may be represented as an index and range of a specific element (e.g., one of the valid values) of the linear combination coefficient. Further, quantization bits for the amplitude coefficient and phase coefficient may be allocated for each valid area.

For example, the information related to the quantization may include bitmap information for the quantization per layer. As an example, each bitmap information for the row (e.g., spatial domain (SD) of the channel information or the column (e.g., frequency domain (FD)) may be included. For example, it may be set in the form of intersection or union of bitmap sequences for the row and column. Different bitmap information may be set for each layer. Or, the bitmap information is information that is common to each layer but separately indicates the intersection portion and the union portion, and information to be reported for each layer may be set to differ.

For example, a plurality of modes for a quantization bit setting scheme may be predefined between the UE and the base station, and information related to quantization may include indication information for the mode used for quantization.

For example, the operation of receiving CSI by the base station (100/200 of FIGS. 14 to 18) in the above-described step S1330 may be implemented by the device of FIGS. 14 to 18 described below. For example, referring to FIG. 15, one or more processors 202 may control one or more transceivers 206 and/or one or more memories 204 to receive CSI, and one or more transceivers 206 may receive the CSI from the UE.

It is possible to perform efficient CSI reporting in terms of payload based on quantization considering the layer/rank and codebook for Type II CSI reporting via the above-described methods and embodiments.

Further, the UE and/or the base station which are operated according to the steps of FIG. 12/FIG. 13, and the above-described methods and embodiments may be specifically implemented by the device of FIGS. 14 to 18. For example, the base station may correspond to a first wireless device, and the UE may correspond to a second wireless device and, in some cases, vice versa.

For example, the above-described base station/UE signaling and operations (e.g., FIG. 12/13) may be processed by one or more processors (e.g., 102 and 202) of FIGS. 14 to 18, and the above-described base station/UE signaling and operations (e.g., FIG. 12/FIG. 13) may be stored in the form of instructions/program (e.g., instructions or executable code) for driving at least one processors (e.g., 102 and 202) of FIGS. 14 to 18, in a memory (e.g., one or more memories (e.g., 104 and 204) of FIGS. 14 to 18).

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 14 illustrates a communication system applied to the disclosure.

Referring to FIG. 14, a communication system (1) applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 15 illustrates wireless devices applicable to the disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which
Disclosure is Applied

FIG. 16 illustrates a signal processing circuit for a transmit signal.

Referring to FIG. 16, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 16 may be performed by the processors 102 and 202 and/or the transceivers 106 and 206 of FIG. 15. Hardware elements of FIG. 16 may be implemented in the processors 102 and 202 and/or the transceivers 106 and 206 of FIG. 15. For example, blocks 1010 to 1060 may be implemented in the processors 102 and 202 of FIG. 15. Further, blocks 1010 to 1050 may be implemented in the processors 102 and 202 of FIG. 15 and the block 1060 of FIG. 15 and the block 1060 may be implemented in the transceivers 106 and 206 of FIG. 15.

A codeword may be transformed into a radio signal via the signal processing circuit 1000 of FIG. 16. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 16. For example, the wireless device (e.g., 100 or 200 of FIG. 15) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 17 illustrates another example of a wireless device applied to the disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 15. For example, the transceiver(s) 114 may include the one or more transceivers 106 and 106 and/or the one or more antennas 108 and 108 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Portable Device Example to which Disclosure is Applied FIG. 18 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 18, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 17, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the scheme of reporting channel state information in the wireless communication system according to the disclosure has been described in connection with examples in which it applies to 5G systems (new RAT systems), the scheme is also applicable to other various wireless communication systems.

The invention claimed is:

1. A method for reporting channel state information (CSI) by a user equipment (UE) in a wireless communication system, the method comprising:
receiving, from a base station (BS), configuration information related to the CSI;
receiving, from the BS, a reference signal;
calculating the CSI based on the reference signal; and
transmitting, to the BS, the CSI, wherein the CSI includes information related to a codebook, wherein the information related to the codebook includes a bitmap related to an amplitude coefficient and a phase coefficient, wherein a size of the bitmap is set based on 2*L*M, wherein L is a number of beams, and wherein M is a number of bases of a frequency domain for the CSI.

2. The method of claim 1, wherein the CSI is transmitted through uplink control information (UCI) including a first part and a second part, and wherein the bitmap is included in the second part.

3. The method of claim 2, wherein a size of the second part is set based on at least one information included in the first part.

4. The method of claim 1, wherein the bitmap is configured per layer.

5. The method of claim 1, wherein the amplitude coefficient and the phase coefficient are included in a first matrix, and wherein the first matrix corresponds to a linear combination of a second matrix including bases of a spatial domain and a third matrix including the bases of the frequency domain.

6. The method of claim 1, wherein the information related to the codebook further includes information related to the amplitude coefficient and information related to the phase coefficient, and wherein the bitmap indicates whether the information related to the amplitude coefficient and the information related to the phase coefficient are reported.

7. The method of claim 1, further comprising:
quantizing the amplitude coefficient and the phase coefficient, wherein the CSI includes information related to quantization.

8. The method of claim 7, wherein the quantization is performed per layer.

9. The method of claim 8, wherein an index of the layer is inversely proportional to a quantization level.

10. The method of claim 9, wherein the information related to the quantization includes the index of the layer, information for a bit number of the amplitude coefficient, and information for a bit number of the phase coefficient.

11. The method of claim 8, wherein the information related to the quantization includes bitmap information for the quantization per layer.

12. The method of claim 8, wherein the information related to the quantization includes at least one of i) channel transform information for each layer, ii) valid value or valid area information for a transformed channel per layer, or iii) quantization bit information per valid area.

13. The method of claim 12, wherein a value other than the valid value is set to 0 as an amplitude of each coefficient is smaller than a specific threshold.

14. The method of claim 12, wherein the valid area information is represented with index and range of one of the valid value.

15. A user equipment (UE) configured to report channel state information (CSI) in a wireless communication system, the UE comprising:
one or more transceivers;
one or more processors; and
one or more memories storing instructions for operations executed by the one or more processors and connected with the one or more processors, wherein the operations comprise:
receiving, from a base station (BS), configuration information related to the CSI;
receiving, from the BS, a reference signal;
calculating the CSI based on the reference signal; and
transmitting, to the BS, the CSI, wherein the CSI includes information related to a codebook, wherein the information related to the codebook includes a bitmap related to an amplitude coefficient and a phase coefficient, wherein a size of the bitmap is set based on 2*L*M, wherein L is a number of beams, and wherein M is a number of bases of a frequency domain for the CSI.

16. A device including one or more memories and one or more processors functionally connected with the one or more memories, wherein the one or more processors execute one or more instructions instructing a user equipment to:
receive, from a base station (BS), configuration information related to channel state information (CSI);
receive, from the BS, a reference signal;
calculate the CSI based on the reference signal; and
transmit the CSI to the BS, wherein the CSI includes information related to a codebook, wherein the information related to the codebook includes a bitmap related to an amplitude coefficient and a phase coefficient, wherein a size of the bitmap is set based on 2*L*M, wherein L is a number of beams, and wherein M is a number of bases of a frequency domain for the CSI.

17. The UE of claim 15, wherein the CSI is transmitted through uplink control information (UCI) including a first part and a second part, and wherein the bitmap is included in the second part.

18. The UE of claim 15, wherein the bitmap is configured per layer.

* * * * *